US010540607B1

(12) United States Patent
Oldridge et al.

(10) Patent No.: US 10,540,607 B1
(45) Date of Patent: Jan. 21, 2020

(54) APPARATUS, METHOD AND ARTICLE TO EFFECT ELECTRONIC MESSAGE REPLY RATE MATCHING IN A NETWORK ENVIRONMENT

(71) Applicant: Plentyoffish Media Inc., Vancouver (CA)

(72) Inventors: Steve Oldridge, Vancouver (CA); Thomas Levi, Vancouver (CA); Sa Li, Burnaby (CA)

(73) Assignee: PLENTYOFFISH MEDIA ULC, Vancouver, British Columbia (CA)

( * ) Notice: Subject to any disclaimer, the term of this patent is extended or adjusted under 35 U.S.C. 154(b) by 1110 days.

(21) Appl. No.: 14/563,504

(22) Filed: Dec. 8, 2014

Related U.S. Application Data

(60) Provisional application No. 61/914,154, filed on Dec. 10, 2013.

(51) Int. Cl.
*G06N 20/00* (2019.01)
*H04L 12/58* (2006.01)

(52) U.S. Cl.
CPC .............. *G06N 20/00* (2019.01); *H04L 51/12* (2013.01)

(58) Field of Classification Search
CPC .............................. G06N 99/005; H04L 51/12
See application file for complete search history.

(56) References Cited

U.S. PATENT DOCUMENTS 5,583,763 A 12/1996 Atcheson et al.
5,724,521 A 3/1998 Dedrick
5,749,091 A 5/1998 Ishida et al.
5,812,992 A 9/1998 de Vries
5,963,951 A 10/1999 Collins
(Continued)

FOREIGN PATENT DOCUMENTS

WO 2008/030670 A1 3/2018

OTHER PUBLICATIONS

Artzi, et al. "Predicting Response to Microblog Posts", 2012 Conference of the North American Chapter fo the Association for Computational Linguistics: Human Language Technologies, pp. 602-606.*

(Continued)

*Primary Examiner* — Li B. Zhen
*Assistant Examiner* — Tsu-Chang Lee
(74) *Attorney, Agent, or Firm* — Seed IP Law Group LLP

(57) ABSTRACT

Relationship building Websites collect considerable self-reported and autonomously collected attribute data on users. Attribute data may be useful for identifying users having compatible or potentially compatible interests, likes, goals, and/or aspirations that the formation of a relationship between the users is possible. At least a portion of the data collected by relationship building Websites may include inbound and outbound messaging statistics and behaviors. When used in conjunction with profile attributes, these messaging statistics and behaviors may be used as training data to generate one or more response predictive models that provide an indication of the profile attributes and messaging behaviors to which a particular user is most likely to respond. Since messaging traffic is a key indicator of relationship building Website health and vitality, it is advantageous to provide users with matches or potential matches with whom they are more likely to exchange messages.

40 Claims, 5 Drawing Sheets

(56) References Cited

U.S. PATENT DOCUMENTS

| | | |
|---|---|---|
| 6,006,225 A | 12/1999 | Bowman et al. |
| 6,018,738 A | 1/2000 | Breese et al. |
| 6,029,195 A | 2/2000 | Herz |
| 6,038,295 A | 3/2000 | Mattes |
| 6,041,311 A | 3/2000 | Chislenko et al. |
| 6,049,777 A | 4/2000 | Sheena et al. |
| 6,058,367 A | 5/2000 | Sutcliffe et al. |
| 6,061,681 A | 5/2000 | Collins |
| 6,064,980 A | 5/2000 | Jacobi et al. |
| 6,134,532 A | 10/2000 | Lazarus et al. |
| 6,169,986 B1 | 1/2001 | Bowman et al. |
| 6,199,067 B1 | 3/2001 | Geller |
| 6,266,649 B1 | 7/2001 | Linden et al. |
| 6,356,879 B2 | 3/2002 | Aggarwal et al. |
| 6,542,749 B2 | 4/2003 | Tanaka et al. |
| 6,681,232 B1 | 1/2004 | Sistanizadeh et al. |
| 6,735,568 B1 | 5/2004 | Buckwalter et al. |
| 6,772,150 B1 | 8/2004 | Whitman et al. |
| 6,782,370 B1 | 8/2004 | Stack |
| 6,783,065 B2 | 8/2004 | Spitz et al. |
| 6,853,982 B2 | 2/2005 | Smith et al. |
| 6,912,505 B2 | 6/2005 | Linden et al. |
| 7,113,917 B2 | 9/2006 | Jacobi et al. |
| 7,240,353 B2 | 7/2007 | Lau et al. |
| 7,313,536 B2 | 12/2007 | Westphal |
| 7,324,998 B2 | 1/2008 | Beres et al. |
| 7,562,814 B1 | 7/2009 | Shao et al. |
| 7,617,164 B2 | 11/2009 | Burges et al. |
| 7,873,695 B2 | 1/2011 | Clegg et al. |
| 8,122,142 B1 | 2/2012 | Svendsen et al. |
| 8,180,765 B2 | 5/2012 | Nicolov |
| 8,225,413 B1 | 7/2012 | De et al. |
| 8,499,247 B2 | 7/2013 | Niyogi et al. |
| 8,566,938 B1 | 10/2013 | Prakash et al. |
| 8,577,874 B2 | 11/2013 | Svendsen et al. |
| 8,620,790 B2 | 12/2013 | Priebatsch |
| 8,626,663 B2 | 1/2014 | Nightingale et al. |
| 8,775,284 B1 | 7/2014 | Crook et al. |
| 8,825,802 B2 | 9/2014 | Pearce |
| 8,849,730 B2* | 9/2014 | Winn .............. G06F 17/30702 706/12 |
| 8,930,398 B1 | 1/2015 | Kishore et al. |
| 9,047,611 B2 | 6/2015 | Krishnamoorthy et al. |
| 9,069,945 B2 | 6/2015 | Singh |
| 9,076,125 B2 | 7/2015 | Manolescu et al. |
| 9,160,742 B1 | 10/2015 | Ackerman et al. |
| 9,218,468 B1 | 12/2015 | Rappaport |
| 9,219,704 B2 | 12/2015 | Hamlin et al. |
| 9,536,221 B2 | 1/2017 | Frind |
| 9,537,706 B2 | 1/2017 | Frind et al. |
| 9,537,814 B2 | 1/2017 | Rubinstein et al. |
| 9,672,289 B1 | 6/2017 | Frind et al. |
| 9,679,259 B1 | 6/2017 | Frind et al. |
| 9,733,811 B2 | 8/2017 | Rad et al. |
| 9,830,669 B1 | 11/2017 | Frind |
| 9,836,533 B1 | 12/2017 | Levi et al. |
| 9,870,465 B1 | 1/2018 | Levi et al. |
| 2002/0091972 A1 | 7/2002 | Harris et al. |
| 2002/0095303 A1 | 7/2002 | Asayama et al. |
| 2002/0156632 A1 | 10/2002 | Haynes et al. |
| 2002/0184080 A1 | 12/2002 | Murad et al. |
| 2003/0065632 A1 | 4/2003 | Hubey |
| 2003/0065635 A1 | 4/2003 | Sahami et al. |
| 2003/0093405 A1 | 5/2003 | Mayer |
| 2003/0176931 A1 | 9/2003 | Pednault et al. |
| 2003/0234519 A1 | 12/2003 | Farmer |
| 2004/0012638 A1 | 1/2004 | Donnelli et al. |
| 2004/0107283 A1 | 6/2004 | Paddon |
| 2004/0210640 A1 | 10/2004 | Chadwick et al. |
| 2004/0230527 A1 | 11/2004 | Hansen et al. |
| 2004/0260781 A1 | 12/2004 | Shostack et al. |
| 2005/0027707 A1 | 2/2005 | Syed |
| 2005/0080857 A1 | 4/2005 | Kirsch et al. |
| 2005/0108227 A1 | 5/2005 | Russell-Falla et al. |
| 2005/0108344 A1 | 5/2005 | Tafoya et al. |
| 2005/0223020 A1 | 10/2005 | Cutlip et al. |
| 2005/0240608 A1 | 10/2005 | Jones et al. |
| 2006/0018522 A1 | 1/2006 | Sunzeri et al. |
| 2006/0059142 A1 | 3/2006 | Zvinyatskovsky et al. |
| 2006/0059159 A1 | 3/2006 | Truong et al. |
| 2006/0149766 A1 | 7/2006 | Ghoting et al. |
| 2006/0206574 A1 | 9/2006 | Bellegarda et al. |
| 2006/0256959 A1 | 11/2006 | Hymes |
| 2007/0005587 A1 | 1/2007 | Johnson et al. |
| 2007/0061334 A1* | 3/2007 | Ramer .............. G06F 17/30867 |
| 2007/0106659 A1 | 5/2007 | Lu et al. |
| 2007/0112792 A1 | 5/2007 | Majumder |
| 2007/0129999 A1 | 6/2007 | Zhou et al. |
| 2007/0156664 A1 | 7/2007 | Norton et al. |
| 2007/0206917 A1 | 9/2007 | Ono et al. |
| 2007/0233603 A1 | 10/2007 | Schmidgall et al. |
| 2007/0265962 A1 | 11/2007 | Bowie, Jr. et al. |
| 2007/0282621 A1 | 12/2007 | Altman et al. |
| 2008/0039121 A1 | 2/2008 | Muller |
| 2008/0086534 A1 | 4/2008 | Bardak et al. |
| 2008/0103971 A1 | 5/2008 | Lukose et al. |
| 2008/0140576 A1 | 6/2008 | Lewis et al. |
| 2008/0140681 A1 | 6/2008 | Ajibade |
| 2008/0189122 A1 | 8/2008 | Coletrane et al. |
| 2009/0016507 A1 | 1/2009 | Altberg et al. |
| 2009/0043805 A1 | 2/2009 | Masonis et al. |
| 2009/0044279 A1 | 2/2009 | Crawford et al. |
| 2009/0066722 A1 | 3/2009 | Kriger et al. |
| 2009/0094048 A1 | 4/2009 | Wallace et al. |
| 2009/0106043 A1 | 4/2009 | Buckwalter et al. |
| 2009/0144329 A1 | 6/2009 | Marlow |
| 2009/0164464 A1 | 6/2009 | Carrico et al. |
| 2009/0216734 A1 | 8/2009 | Aghajanyan et al. |
| 2009/0248599 A1 | 10/2009 | Hueter et al. |
| 2009/0299645 A1 | 12/2009 | Colby et al. |
| 2009/0319466 A1 | 12/2009 | Liu et al. |
| 2010/0002920 A1 | 1/2010 | Cosatto et al. |
| 2010/0036806 A1 | 2/2010 | Lam et al. |
| 2010/0070350 A1 | 3/2010 | Paunikar et al. |
| 2010/0094767 A1 | 4/2010 | Miltonberger |
| 2010/0114614 A1 | 5/2010 | Sharpe |
| 2010/0145869 A1 | 6/2010 | Brown |
| 2010/0169376 A1 | 7/2010 | Chu |
| 2010/0262611 A1* | 10/2010 | Frind .................... G06Q 10/10 707/748 |
| 2010/0318544 A1 | 12/2010 | Nicolov |
| 2011/0045801 A1 | 2/2011 | Parker, II |
| 2011/0055210 A1 | 3/2011 | Meredith et al. |
| 2011/0082824 A1 | 4/2011 | Allison et al. |
| 2011/0107260 A1 | 5/2011 | Park et al. |
| 2011/0125509 A1 | 5/2011 | Lidstrom et al. |
| 2011/0131085 A1 | 6/2011 | Wey |
| 2011/0145238 A1 | 6/2011 | Stork |
| 2011/0167059 A1 | 7/2011 | Fallah |
| 2011/0178881 A1 | 7/2011 | Pulletikurty |
| 2011/0191768 A1 | 8/2011 | Smith |
| 2011/0208737 A1 | 8/2011 | Shmueli et al. |
| 2011/0219310 A1 | 9/2011 | Robson |
| 2011/0231396 A1 | 9/2011 | Dhara et al. |
| 2011/0270813 A1 | 11/2011 | Cok et al. |
| 2011/0306028 A1 | 12/2011 | Galimore |
| 2012/0005204 A1 | 1/2012 | Diaz et al. |
| 2012/0023566 A1 | 1/2012 | Waterson et al. |
| 2012/0059850 A1 | 3/2012 | Bent et al. |
| 2012/0088524 A1 | 4/2012 | Moldavsky et al. |
| 2012/0089618 A1 | 4/2012 | Anschutz et al. |
| 2012/0102410 A1 | 4/2012 | Gewecke et al. |
| 2012/0109959 A1 | 5/2012 | Benhadda |
| 2012/0110085 A1 | 5/2012 | Malik et al. |
| 2012/0123828 A1 | 5/2012 | Pahls et al. |
| 2012/0151417 A1 | 6/2012 | Wong et al. |
| 2012/0155296 A1 | 6/2012 | Kashanian |
| 2012/0158586 A1 | 6/2012 | Ganti et al. |
| 2012/0166285 A1 | 6/2012 | Shapiro et al. |
| 2012/0190386 A1 | 7/2012 | Anderson |
| 2012/0197802 A1 | 8/2012 | Smith et al. |
| 2012/0198002 A1 | 8/2012 | Goulart et al. |
| 2012/0284212 A1 | 11/2012 | Lin et al. |
| 2012/0284341 A1 | 11/2012 | Masood et al. |

(56) References Cited

U.S. PATENT DOCUMENTS

| | | | | |
|---|---|---|---|---|
| 2013/0097246 | A1* | 4/2013 | Zifroni | G06Q 50/01 709/204 |
| 2013/0138741 | A1 | 5/2013 | Redstone et al. | |
| 2013/0212680 | A1 | 8/2013 | Winn et al. | |
| 2013/0247149 | A1 | 9/2013 | Sanft et al. | |
| 2013/0262984 | A1 | 10/2013 | Mehr et al. | |
| 2013/0282745 | A1 | 10/2013 | Mishra et al. | |
| 2013/0297590 | A1 | 11/2013 | Zukovsky et al. | |
| 2013/0325948 | A1 | 12/2013 | Chen et al. | |
| 2014/0025702 | A1 | 1/2014 | Curtiss et al. | |
| 2014/0052861 | A1 | 2/2014 | Frind et al. | |
| 2014/0058763 | A1 | 2/2014 | Zizzamia et al. | |
| 2014/0079297 | A1* | 3/2014 | Tadayon | G06K 9/00 382/118 |
| 2014/0095598 | A1 | 4/2014 | Schornack et al. | |
| 2014/0095603 | A1 | 4/2014 | Bhardwaj et al. | |
| 2014/0122628 | A1 | 5/2014 | Yao et al. | |
| 2014/0136933 | A1 | 5/2014 | Berger et al. | |
| 2014/0156750 | A1 | 6/2014 | De Cristofaro et al. | |
| 2014/0207637 | A1 | 7/2014 | Groarke | |
| 2014/0317736 | A1 | 10/2014 | Cao et al. | |
| 2015/0026027 | A1 | 1/2015 | Priess et al. | |
| 2015/0100530 | A1 | 4/2015 | Mnih et al. | |
| 2015/0120583 | A1* | 4/2015 | Zarrella | G06Q 50/01 705/317 |
| 2015/0127590 | A1 | 5/2015 | Gay et al. | |
| 2015/0161649 | A1 | 6/2015 | Eggleston et al. | |
| 2015/0199010 | A1 | 7/2015 | Coleman et al. | |
| 2015/0348208 | A1 | 12/2015 | Nordyke et al. | |
| 2015/0379574 | A1 | 12/2015 | Pattan et al. | |
| 2016/0292688 | A1 | 10/2016 | Barton et al. | |
| 2017/0242569 | A1 | 8/2017 | Frind et al. | |
| 2018/0039773 | A1 | 2/2018 | Levi et al. | |
| 2018/0052991 | A1 | 2/2018 | Levi et al. | |

OTHER PUBLICATIONS

Avrahami et al., "Responsiveness in Instant Messaging: Predictive Models Supporting Inter-Personal Communication", CHI 2006 Proceedings, Apr. 22-27, 2006.*

Tyler, et al., "When Can I Expect and Email Response? A Study of Rhythms in Email Usage", ECSCW 2003: Proceedings of the Eighth European Conference on computer Suppored Cooperative Work, Sep. 14-18, 2003, Helsinki, Finland, pp. 1-20.*

Frind et al., "Apparatus, Method and Article to Facilitate Matching of Clients in a Networked Environment," Amendment filed Dec. 8, 2015, for U.S. Appl. No. 13/971,483, 33 pages.

Frind et al., "Apparatus, Method and Article to Facilitate Matching of Clients in a Networked Environment," Office Action, dated Apr. 6, 2016, for U.S. Appl. No. 13/971,483, 26 pages.

Frind et al. "Apparatus, Method and Article to Facilitate Matching of Clients in a Networked Environment," Office Action, dated Sep. 21, 2015, for U.S. Appl. No. 13/971,483, 25 pages.

Frind et al., "Apparatus, Method and Article to Facilitate Matching of Clients in a Networked Environment," U.S. Appl. No. 61/691,082, filed Aug. 20, 2012, 131 pages.

Frind, "System and Method for Adaptive Matching of User Profiles Based on Viewing and Contact Activity for Social Relationship Services," Amendment filed Sep. 24, 2015, for U.S. Appl. No. 12/488,512, 14 pages.

Frind, "System and Method for Adaptive Matching of User Profiles Based on Viewing and Contact Activity for Social Relationship Services," Amendment filed Mar. 11, 2016, for U.S. Appl. No. 12/488,512, 15 pages.

Frind, "System and Method for Adaptive Matching of User Profiles Based on Viewing and Contact Activity for Social Relationship Services," Office Action, dated Jun. 24, 2015, for U.S. Appl. No. 12/488,512, 19 pages.

Frind, "System and Method for Adaptive Matching of User Profiles Based on Viewing and Contact Activity for Social Relationship Services," Office Action, dated Nov. 12, 2015, for U.S. Appl. No. 12/488,512, 21 pages.

Frind et al., "Systems and Methods for Training and Employing a Machine Learning System in Evaluating Entity Pairs," Amendment filed May 27, 2016, for U.S. Appl. No. 14/163,849, 23 pages.

Frind et al., "Systems and Methods for Training and Employing a Machine Learning System in Evaluating Entity Pairs," Office Action, dated Jan. 29, 2016, for U.S. Appl. No. 14/163,849, 61 pages.

Frind et al., "System and Methods for Training and Employing a Machine Learning System in Evaluating Entity Pairs," U.S. Appl. No. 61/756,912, filed Jan. 25, 2013, 75 pages.

Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.

Kuchka et al., "Apparatus, Method and Article to Identify Discrepancies Between Clients and in Response Prompt Clients in a Networked Environment," Office Action, dated Apr. 4, 2016, for U.S. Appl. No. 14/204,939, 80 pages.

Oldridge et al., "Apparatus, Method and Article to Facilitate User Behavioral Based Determination of User Values in a Network Environment," U.S. Appl. No. 14/737,121, filed Jun. 11, 2015, 68 pages.

Alsaleh et al., "Improving Matching Process in Social Network Using Implicit and Explicit User Information," *Web Technologies and Applications* 313-320, 2011.

Frind et al. "Systems and Methods for Training and Employing a Machine Learning System in Evaluating Entity Pairs," Office Action, dated Aug. 16, 2016, for U.S. Appl. No. 14/163,849, 60 pages.

Kuchka et al., "Apparatus, Method and Article to Identify Discrepancies Between Clients and in Response Prompt Clients in a Networked Environment," Amendment, Filed Aug. 4, 2016, for U.S. Appl. No. 14/204,939, 38 pages.

Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.

Fiore et al., "Assessing Attractiveness in Online Dating Profiles," *CHI 2008 Proceedings—Friends, Foe, and Family*, pp. 797-806, 2008.

Frind et al., "Apparatus, Method and Article to Facilitate Matching of Clients in a Networked Environment," Response, filed Jul. 21, 2016, for U.S. Appl. No. 13/971,483, 21 pages.

Notice of Allowance, dated Aug. 24, 2016, for U.S. Appl. No. 12/488,512, Frind, "System and Method for Adaptive Matching of User Profiles Based on Viewing and Contact Activity for Social Relationship Services," 20 pages.

Office Action, dated Sep. 20, 2016, for U.S. Appl. No. 14/339,328, Frind et al., "Apparatus, Method and Article to Facilitate Matching of Clients in a Networked Environment," 30 pages.

Office Action, dated Sep. 8, 2016, for U.S. Appl. No. 14/204,939, Kuchka et al., "Apparatus, Method and Article to Identify Discrepancies Between Clients and in Response Prompt Clients in a Networked Environment," 104 Pages.

"Binary search tree," Wikipedia, retrieved on Feb. 24, 2015, from http://en.wikipedia.org/wiki/Binary_search_tree, 11 pages.

"Chargeback," Wikipedia, retrieved on Feb. 24, 2015, from http://en.wikipedia.org/wiki/Chargeback, 4 pages.

"Merchant account," Wikipedia, retrieved on Feb. 24, 2015, from http://en.wikipedia.org/wiki/Merchant_account, 10 pages.

"Understanding Chargebacks: A Guide to Chargebacks for Online Merchants," DalPay, retrieved on Feb. 24, 2015, from https://www.dalpay.com/en/support/chargebacks.html, 6 pages.

Frind, "System and Method for Adaptive Matching of User Profiles Based on Viewing and Contact Activity for Social Relationship Services," Amendment filed Jan. 6, 2015, for U.S. Appl. No. 12/488,512, 12 pages.

Frind, "System and Method for Adaptive Matching of User Profiles Based on Viewing and Contact Activity for Social Relationship Services," Amendment filed Feb. 13, 2015, for U.S. Appl. No. 12/488,512, 12 pages.

Levi et al., "Apparatus, Method and Article to Effect User Interest-Based Matching in a Network Environment," U.S. Appl. No. 14/668,808, filed Mar. 25, 2015, 111 pages.

(56) References Cited

OTHER PUBLICATIONS

Levi et al., "Apparatus, Method and Article to Facilitate Automatic Detection and Removal of Fraudulent User Information in a Network Environment," U.S. Appl. No. 14/561,004, filed Dec. 4, 2014, 89 pages.

MacKinnon, "Apparatus, Method and Article to Facilitate Exchange of Messages in a Network Environment," U.S. Appl. No. 14/575,888, filed Dec. 18, 2014, 83 pages.

Oldridge et al., "Apparatus, Method and Article to Predict and Prevent Chargebacks in a Network Environment," U.S. Appl. No. 14/679,792, filed Apr. 6, 2015, 69 pages.

Oldridge et al., "Systems and Methods for Training and Employing a Machine Learning System in Providing Service Level Upgrade Offers,"U.S. Appl. No. 14/672,749, filed Mar. 30, 2015, 95 pages.

Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.

Therneau et al., "An Introduction to Recursive Partitioning Using the RPART Routines," Mayo Clinic, Feb. 24, 2015, 62 pages.

Frind et al., "Apparatus, Method and Article to Facilitate Matching of Clients in a Networked Environment," U.S. Appl. No. 61/857,617, filed Jul. 23, 2013, 138 pages.

Frind et al., "Apparatus, Method and Article to Facilitate Matching of Clients in a Networked Environment," U.S. Appl. No. 14/339,328, filed Jul. 23, 2014, 135 pages.

Frind et al., "Apparatus, Method and Article to Facilitate Matching of Clients in a Networked Environment," Preliminary Amendment filed Jul. 23, 2014, for U.S. Appl. No. 14/339,328, 11 pages.

Frind et al., "Systems and Methods for Training and Employing a Machine Learning System in Evaluating Entity Pairs," U.S. Appl. No. 14/163,849, filed Jan. 24, 2014, 75 pages.

Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.

Frind, "System and Method for Adaptive Matching of User Profiles Based on Viewing and Contact Activity for Social Relationship Services," Office Action dated Aug. 16, 2011, for U.S. Appl. No. 12/488,512, 14 pages.

Frind, "System and Method for Adaptive Matching of User Profiles Based on Viewing and Contact Activity for Social Relationship Services," Amendment filed Nov. 16, 2011, for U.S. Appl. No. 12/488,512, 16 pages.

Frind, "System and Method for Adaptive Matching of User Profiles Based on Viewing and Contact Activity for Social Relationship Services," Office Action dated Mar. 5, 2012, for U.S. Appl. No. 12/488,512, 19 pages.

Frind, "System and Method for Adaptive Matching of User Profiles Based on Viewing and Contact Activity for Social Relationship Services," Amendment filed May 24, 2012, for U.S. Appl. No. 12/488,512, 20 pages.

Frind, "System and Method for Adaptive Matching of User Profiles Based on Viewing and Contact Activity for Social Relationship Services," Office Action dated May 19, 2014, for U.S. Appl. No. 12/488,512, 20 pages.

Frind, "System and Method for Adaptive Matching of User Profiles Based on Viewing and Contact Activity for Social Relationship Services," Amendment filed Aug. 12, 2014, for U.S. Appl. No. 12/488,512, 11 pages.

Frind, "System and Method for Adaptive Matching of User Profiles Based on Viewing and Contact Activity for Social Relationship Services," Office Action dated Nov. 18, 2014, for U.S. Appl. No. 12/488,512, 17 pages.

Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.

Levi et al., "Apparatus, Method and Article to Effect User Interest-Based Matching in a Network Environment," U.S. Appl. No. 61/976,296, filed Apr. 7, 2014, 111 pages.

Levi et al., "Apparatus, Method and Article to Facilitate Automatic Detection and Removal of Fraudulent User Information in a Network Environment," U.S. Appl. No. 61/911,908, filed Dec. 4, 2013, 88 pages.

MacKinnon, "Apparatus, Method and Article to Facilitate Exchange of Messages in a Network Environment," U.S. Appl. No. 61/918,466, filed Dec. 19, 2013, 83 pages.

Oldridge et al., "Apparatus, Method and Article to Facilitate User Behavioral Based Dertermination of User Values in a Network Environment," U.S. Appl. No. 62/013,849, filed Jun. 18, 2014, 68 pages.

Oldridge et al., "Systems and Methods for Training and Employing a Machine Learning System in Providing Service Level Upgrade Offers," U.S. Appl. No. 61/974,129, filed Apr. 2, 2014, 95 pages.

Tekle et al., "Apparatus, Method and Article to Facilitate Automatic Detection and Removal of Fraudulent Advertising Accounts in a Network Environment," U.S. Appl. No. 61/948,159, filed Mar. 5, 2014, 79 pages.

Kononenko, "Semi-Naïve Bayesian Classifier," *EWSL-91 Proceedings of the European working session on learning on Machine learning,* Porto, Portugal, 1991, pp. 206-219.

Notice of Allowance, dated Feb. 10, 2017, for U.S. Appl. No. 14/163,849, Frind et al., "Systems and Methods for Training and Employing a Machine Learning System in Evaluating Entity Pairs," 5 pages.

Notice of Allowance, dated Feb. 3, 2017, for U.S. Appl. No. 14/339,328, Frind et al., "Apparatus, Method and Article to Facilitate Matching of Clients in a Networked Environment," 14 pages.

Office Action, dated Feb. 3, 2017, for U.S. Appl. No. 14/561,004, Levi et al., "Apparatus, Method and Article to Facilitate Automatic Detection and Removal of Fraudulent User Information in a Network Environment," 23 pages.

Office Action, dated Jul. 13, 2017, for U.S. Appl. No. 14/638,225, Tekle et al., "Apparatus, Method and Article to Facilitate Automatic Detection and Removal of Fraudulent Advertising Accounts in a Network Environment," 59 pages.

Office Action, dated May 17, 2017, for U.S. Appl. No. 14/204,939, Kuchka et al., "Apparatus, Method and Article to Identify Discrepancies Between Clients and in Response Prompt Clients in a Networked Environment," 82 Pages.

Supplemental Notice of Allowability, dated Oct. 28, 2016, for U.S. Appl. No. 13/971,483, Frind et al., "Apparatus, Method and Article to Facilitate Matching of Clients in a Networked Environment," 9 pages.

Arbelaitz et al., "Web usage and content mining to extract knowledge for modelling the users of the Bidasoa Turismo website and to adapt it," *Expert Systems with Applications* 40(18):7478-7491, 2013.

Dokoohaki et al., "Mining Divergent Opinion Trust Networks through Latent Dirichlet Allocation," *International Conference on Advances in Social Networks Analysis and Mining,* IEEE/ACM, Istanbul, Turkey, pp. 879-886, 2012.

Geroimenko (Ed.) et al., *Visualizing the Semantic Web,* Springer, London, 2006, Chapter 14, pp. 229-241, Paolillo et al., "Social Network Analysis on the Semantic Web: Techniques and Challenges for Visualizing FOAF," 13 pages.

Khadangi et al., "Measuring Relationship Strength in Online Social Networks based on users' activities and profile information," *3rd International Conference on Computer and Knowledge Engineering,* Ferdowsi University of Mashhad, 2013, 5 pages.

Notice of Allowance, dated Aug. 2, 2017, for U.S. Appl. No. 14/668,808, Levi et al., "Apparatus, Method and Article to Effect User Interest-Based Matching in a Network Environment," 12 pages.

Parimi et al., "Predicting Friendship Links in Social Networks Using a Topic Modeling Approach," *Pacific-Asia Conference on Knowledge Discovery and Data Mining,* Advances in Knowledge Discovery and Data Mining, pp. 75-86, 2011.

(56) References Cited

OTHER PUBLICATIONS

Peled et al., "Entity Matching in Online Social Networks," *Proceedings of the 2013 International Conference on Social Computing*, pp. 339-344, 2013.
Zhao et al., "Relationship strength estimation for online social networks with the study on Facebook," *Neurocomputing 95*:89-97, 2012.
Office Action, dated Jul. 26, 2018, for U.S. Appl. No. 14/575,888, MacKinnon, "Apparatus, Method and Article to Facilitate Exchange of Messages in a Network Environment," 41 pages.
Office Action, dated Oct. 11, 2018, for U.S. Appl. No. 14/204,939, Kuchka et al., "Apparatus, Method and Article to Identify Discrepancies Between Clients and in Response Prompt Clients in a Networked Environment," 66 pages.
Office Action, dated Aug. 28, 2018, for U.S. Appl. No. 15/782,354, Levi et al., "Apparatus, Method and Article to Facilitate Automatic Detection and Removal of Fraudulent User Information in a Network Environment," 9 pages.
Brammer, "Who Commits Online Advertising Fraus and How to Stip It," published online on Sep. 21, 2015, downloaded from http://blog.ezanga.com/blog/who-commits-online-avertising-fraud-and-how-to-stop-it on Jun. 16, 2018, 8 pages.
Moulin et al., "Support Vector Machines for Transient Stability Analysis of Large-Scale Power Systems," *IEEE Transactions on Power Systems 19*(2):818-825, 2004.
Notice of Allowance, dated Jun. 20, 2018, for U.S. Appl. No. 14/638,225, Tekle et al., "Apparatus, Method and Article to Facilitate Automatic Detection and Removal of Fraudulent Advertising Accounts in a Network Environment," 12 pages.
Office Action, dated Jul. 10, 2018, for U.S. Appl. No. 14/672,749, Oldridge et al., "Systems and Methods for Training and Employing a Machine Learning System in Providing Service Level Upgrade Offers," 66 Pages.
Sharma et al., "A Neural Network based Approach for Predicting Customer Churn in Cellular Network Services," *International Journal of Computer Applications (0975-8887) 27*(11):26-31, 2011.
Office Action, dated Dec. 29, 2017, for U.S. Appl. No. 14/575,888, MacKinnon, "Apparatus, Method and Article to Facilitate Exchange of Messages in a Network Environment," 31 pages.
Office Action, dated Feb. 1, 2018, for U.S. Appl. No. 14/638,225, Tekle et al., "Apparatus, Method and Article to Facilitate Automatic Detection and Removal of Fraudulent Advertising Accounts in a Network Environment," 38 pages.
Office Action, dated Feb. 28, 2018, for U.S. Appl. No. 14/679,792, Oldridge et al., "Apparatus, Method and Article to Predict and Prevent Chargebacks in a Network Environment," 64 pages.
Office Action, dated Mar. 20, 2018, for U.S. Appl. No. 14/737,121, "Oldridge et al., Apparatus, Method and Article to Facilitate User Behavioral Based Determination of User Values in a Network Environment," 39 pages.

* cited by examiner

APPARATUS, METHOD AND ARTICLE TO EFFECT ELECTRONIC MESSAGE REPLY RATE MATCHING IN A NETWORK ENVIRONMENT

BACKGROUND

Technical Field

The present disclosure generally relates to computing systems and methods, and in particular to systems and methods that facilitate the provision of electronic messaging within a population of networked end-users.

Description of the Related Art

Electronic messaging such as electronic mail and instant messaging has rapidly replaced both telephonic and written communication in many instances. Such electronic messaging is used in business, commercial, and personal settings. The relative ease and low cost with which electronic messages are communicated has resulted in a dramatic, ongoing, increase in the volume of messages communicated to recipients. In many instances, a recipient may receive tens, hundreds, or even thousands of emails each day. In such instances, the recipient may be interested in only a few of the received electronic messages and may view the other received messages as "spam" or similar unwanted, undesired, and often unsolicited, communication. While solutions such as filters, firewalls, and blacklists may block the delivery of undesired electronic messages, such solutions are successful only to the extent that incoming messages are readily identifiable as falling within a group or class of restricted or limited delivery messages. To save time and to reduce messaging costs to both the message sender and the message recipient, providing the sender with a list of recipients who are most likely to respond to the sender's electronic message based on one or more identified prior behaviors of the recipient may improve the delivery efficiency, response rate, and overall level of perceived value placed in the electronic messaging system by both the sender and the recipient.

Pairing or match-making finds use and purpose in many areas, from the smallest of interpersonal relationships to the largest of commercial partnerships. With the extraordinary reach of the Internet into virtually every country on the planet and the computational power of modern-day processors, the extension of personal and commercial pairing or match-making into the digital world could be viewed as inevitable.

In contrast to traditional digital models used in configuring device decision making, machine learning systems instead perform decision making based on connections or pathways established between processing elements. Such structure is more closely analogous to the interconnected neurological pathways found in a biological brain. For example, within a neural network type machine learning system, the organization and weights assigned to particular connections determine the ultimate output provided at the output layer of the neural network. Machine learning systems have been found to produce accurate models that provide effective event predictions when trained using a large database of representative historical examples that promote the formation of connections within the machine learning system, the organization of the connections, and the weighting of the connections. When in a run time mode, the organization and weighting of the connections within the machine learning system provide the decision making capabilities within the machine learning system's system (e.g., the hidden layer in neural networks). The run-time performance and accuracy of a machine learning system is to a large extent a function of these connections which, in turn, are dependent upon the quality, number, and types of prior examples provided during the training of the machine learning system.

After completing the training process, a machine learning system can derive meaning from complicated or imprecise data and can extract patterns and detect trends that are too complex to be noticed by either humans or other computer techniques. In at least some instances, a trained machine learning system may be considered an "expert" in analyses performed on data that falls within the limits of the historical training examples provided to the machine learning system during one or more training epochs. As an "expert," a trained machine learning system hastens the analysis and derivation of relationships within a large volume of data having numerous known and unknown dependencies. Such a data volume and the presence of known and unknown dependencies render comparable human analysis time-consuming at best, and near-impossible in many instances. The strength of machine learning systems lies in the analysis of voluminous and complex data with a high degree of accuracy to ascertain the answers to various "what if" type questions.

BRIEF SUMMARY

Relationship building Websites collect considerable data on Website users. Usually, at least a portion of such data may be self-reported by a user of the Website. At times, a portion of such data may be autonomously collected by a server or other computer that implements the Website, for example such data may be extracted from the processor-based device used to access the Website by the user. Such collected data may be collectively referred to as user attribute data. Such user attribute data is collected by the server or other computer, logically associated with a particular user, and stored in one or more databases. This user profile data provides a key repository of data used by the matching service entity to characterize the user and also identify matches and potential matches that may be of interest to the user based on the express or implied preferences gleaned from the user profile attributes.

However, such user profile information provides a glimpse into only limited aspects of a user personality, interests, qualifications, abilities, and desires, and fails to consider the real-world interaction of the user with others, such as other Website users. For example, many relationship building Websites provide a mechanism for users to communicate via electronic messaging. Frequently, users are provided with logical constructs such as an outbox from which electronic messages to other users can be communicated and an inbox into which electronic messages from other users can be received. In fact, the exchange of messages across a relationship building Website has been found to provide an important indicator of the health and vitality of the Website and the population of users subscribed to the Website. Therefore, encouraging new or existing users to generate initial messages to other users who are most likely to respond to the initial message not only improves messaging traffic across the Website, but also improves the user experience and the actual and/or perceived value of the Website for all users.

For example, if matching service (e.g., dating, job hunting) entity user "Andy" transmits initial messages to twenty other matching service entity users identified by the matching service entity as either a match or a potential candidate based only on user profile attributes and receives only one or two response messages, Andy may view the Website experience in a negative light and perceive very little value in the quality of service provided by the matching service entity. Conversely, if Andy transmits initial messages to twenty other users identified by the matching service entity as either a match or a potential candidate based on user profile attributes, messaging activity, and messaging behavior, and receives fifteen response messages, Andy is likely to view the Website experience in a positive light and will likely perceive significant value in the quality of service provided by the matching service entity.

In at least some instances, matching service entities may track user messaging activity and user messaging behavior. Such messaging and behavior data, when analyzed in conjunction with user profile attribute data, can provide significant insight into the "type" of user to which a particular user is most likely to respond. Such insight may be mathematically quantified in the form of one or more response predictive models generated by a machine learning system trained using training data in the form of historical user profile attribute data, user message activity data, and user message behavior data. The one or more response predictive models may generate output data able to predict and/or identify, either alone or in mathematical and/or logical combination with other models and/or algorithms, matches and potential matches having the greatest likelihood of responding to messages from a user having one or more particular user profile attributes.

The matching service entity may identify matches and potential matches when new users initially subscribe to the matching service entity (i.e., on sign-up, a new user is provided with matches or potential candidates identified by the response predictive model as having the greatest likelihood of responding to a user having the user profile attributes identical, similar, or even complimentary to the new user). The matching service entity may also identify such matches and potential candidates intermittently, periodically, or continuously by running some or all of the response predictive models against user profile attribute data stored in one or more user attribute databases or data stores.

Such response predictive models may be updated or refined on an intermittent, periodic, or continuous basis by generating new training data sets using user profile attribute data, user message activity data, and user message behavior data collected by the matching service entity. Such updates and refinements may include a back propagation of data into some or all of the response predictive models in order to adjust the connections and/or connection weights in some or all of the response predictive models. Thus, response predictive models may be updated and refined based on actual user data supplied by the matching service entity on a real time or near-real time basis.

A method of operation in a system to enhance messaging between users may be summarized as including: forming an initial data set, the initial data set including: user profile information for a plurality of users, user behavioral information for at least some of the plurality of users, and message data indicative of messaging activity between at least some of the plurality of users; organizing the initial data set into a training data set and a test data set; generating a response predictive model from the training data set that includes the user profile information, the user behavioral information and message data; and evaluating the response predictive model generated from the training data set against the corresponding test data set.

Forming an initial data set may include, for a subset of users, filtering: the user profile information, the user behavioral information, and the messaging data for that subset of users from that of an entire set of users. Organizing the initial data set into a training data set and a test data set may include separating the initial data set into the training data set and the test data set. Forming an initial data set may include: selecting users who have received at least a first defined minimum number of messages, and who responded to at least a second defined minimum number of the received messages; and including the user profile information, the user behavioral information, and the messaging data for the selected users in the initial data set. Selecting users may further include selecting only users who have a logically associated attribute value indicative of a female gender. Organizing the initial data set into a training data set and a test data set may include randomly selecting for inclusion in either the training data set or the test data set the user profile information, the user behavioral information, and the messaging data from all of the selected users on a message-by-message basis. The test data set and the training data set may not be mutually exclusive with respect to the users represented in each. Organizing the initial data set into a training data set and a test data set may include randomly separating the selected users for representation in one or the other of the training data set or the test data set. The test data set and the training data set may be mutually exclusive with respect to the users represented in each. Generating a response predictive model based from the training data set may include adjusting model weights based on back propagation. Generating a response predictive model from the training set may include determining whether a defined maximum number of training epochs has been reached, and terminating the response predictive model generation in response to reaching the defined maximum number of training epochs. The response predictive model may be predictive of whether a message sent by one user will receive a response from another user.

The method of operation in a system to enhance messaging between users may further include: collecting at least one of: the user profile information, the user behavioral information, or the messaging data for actual messaging between the plurality of users.

Collecting user profile information may include collecting at least one of: a user age, a user gender, a user country, a user ethnicity, or a user profession. Collecting user behavioral information may include collecting at least one of: user specific messaging rates, user specific page views, or user specific login data.

The method of operation in a system to enhance messaging between users may further include converting at least one of: the user profile information, the user behavioral information, or the messaging data to at least one of a binary or a numerical representation.

The method of operation in a system to enhance messaging between users may further include identifying at least one response predictive model for use.

Identifying at least one response predictive model for use may include comparing the response predictive model to other response predictive models.

The method of operation in a system to enhance messaging between users may further include using the identified response predictive model.

The method of operation in a system to enhance messaging between users may further include incorporating the identified response predictive model into a determining of potential candidates.

Incorporating the identified response predictive model into a determining of potential candidates may include adjusting weights in a matching algorithm.

The method of operation in a system to enhance messaging between users may further include, on creation of a new user profile, informing other users who have a high predicted response rate of responding to an initial message from a new user logically associated with the new user profile.

A system to enhance messaging between users may be summarized as including: at least one processor; and at least one non-transitory processor-readable medium communicatively coupled to the least one processor, wherein the at least one processor may: form an initial data set, the initial data set comprising user profile information for a plurality of users, user behavioral information for at least some of the plurality of users, and message data indicative of messaging activity between at least some of the plurality of users; organize the initial data set into a training data set and a test data set; generate a response predictive model from the training data set which includes the user profile information, the user behavioral information and message data; and evaluate the response predictive model generated from the training data set against the corresponding test data set.

In order to form an initial data set, the at least one processor may select users who have received at least a first defined minimum number of messages, and who responded to at least a second defined minimum number of the received messages, and including in the initial data set the user profile information, the user behavioral information and the messaging data for the selected users. The at least one processor may further select only users who have a logically associated attribute value indicative of a female gender. In order to organize the initial data set into a training data set and a test data set, the at least one processor may randomly select for inclusion in either the training data set or the test data set the user profile information, the user behavioral information, and the messaging data from all of the selected users on a message by message basis. The test data set and the training data set may not be mutually exclusive with respect to the users represented in each. In order to organize the initial data set into a training data set and a test data set, the at least one processor may randomly separate the selected users for representation in one or the other of the training data set or the test data set. The test data set and the training data set may be mutually exclusive with respect to the users represented in each. The at least one processor adjusting model may weight based on back propagation in order to generate the response predictive model. The at least one processor may further collect at least one of: the user profile information, the user behavioral information, or the messaging data for actual messaging between the plurality of users. To collect user profile information, the at least one processor may collect an attribute value indicative of at least one of: a user's age, a user's gender, a user's country, a user's ethnicity, or a user's profession. To collect user behavioral information, the at least one processor may collect data indicative of at least one of: user specific messaging rates, user specific page views, user specific login data. The at least one processor may further convert at least one of: the user profile information, the user behavioral information, or the messaging data to at least one of a binary or a numerical representation. The at least one processor may further: compare the response predictive model to other response predictive models; and identify at least one response predictive model for use based on the comparison. The at least one processor may further: use the identified response predictive model; and incorporate the identified response predictive model into a determination of potential candidates. The at least one processor may further: inform a new user of other users who have a high predicted response rate of responding to an initial message from the new user based at least in part on the responsive predictive model.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
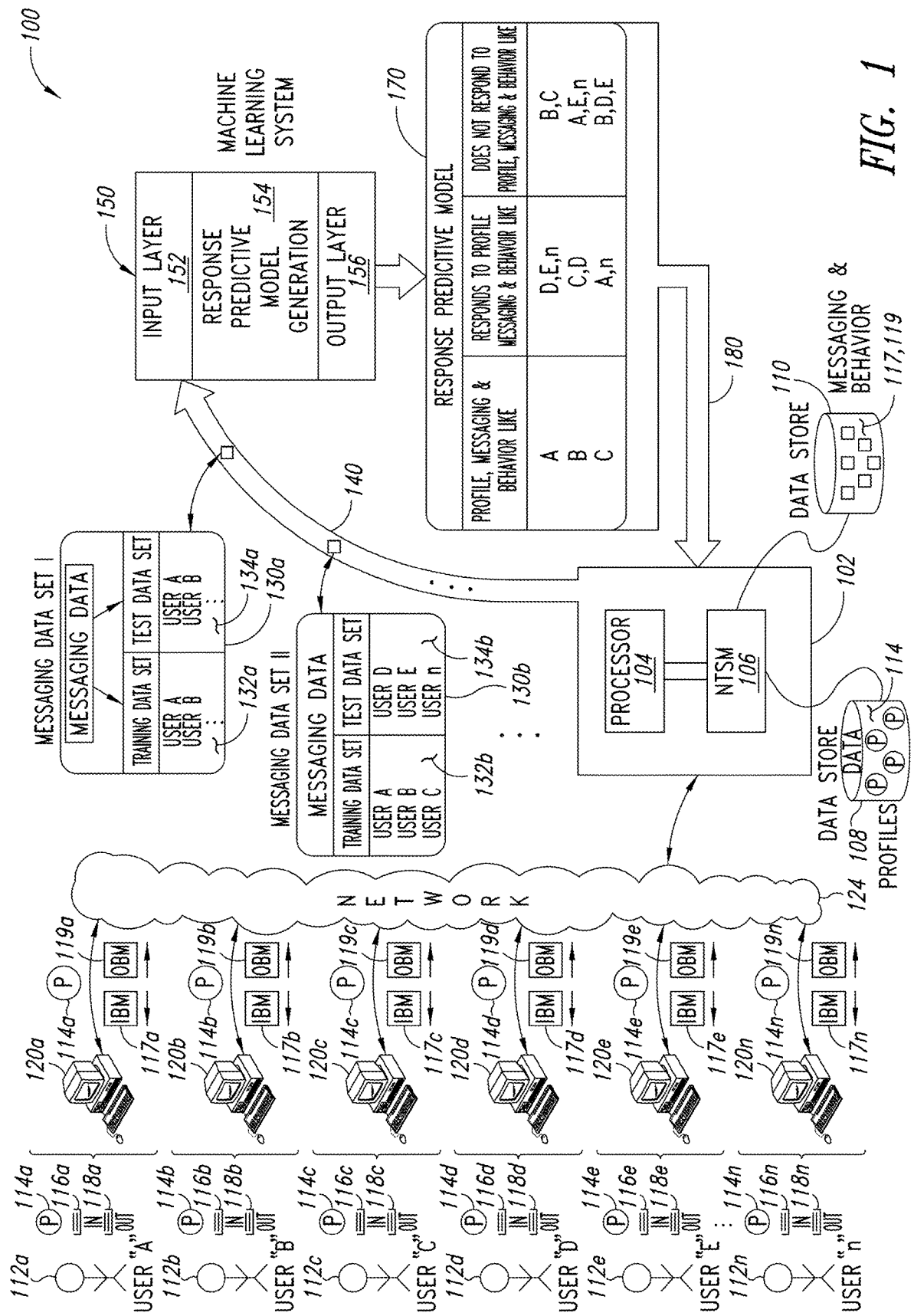
FIG. 1 is a schematic view of a matching service environment that includes a communicably coupled machine learning system useful for developing one or more response predictive models based on user profile attribute data, user messaging data, and user messaging behavior data, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Operational level details of machine learning systems, such a neural networks, and the formation, organization, and development of connections therein are known to those of skill in the relevant arts and are therefore neither described nor shown in detail herein. Construction, specification and operational level details of standard electronic components such as processors, nontransitory storage media and/or devices, input/output interfaces, and wired and wireless networking are also known to those of skill in the relevant arts and are also neither described nor shown in detail herein.

While several examples of suitable systems and computational techniques are described in terms of a machine learning system that employ neural networks with back propagation, other forms of computing systems may be employed. For example, suitable systems and computational techniques may include any one or more of: support vector machines, random forests, tree models, Bayesian learners, random ferns, decision trees, One Rule (OneR), recursive partitioning, regression trees, rule induction, logistic Gaussian process, discriminant analysis, and general neural nets including back propagation and back propagation with momentum.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein users referred to by the descriptive terms "match," "matches," "potential candidate," "potential candidates," "potential candidate match," and "potential candidate matches" collectively refer to a set of users that includes any number of potential message responding users having one or more attribute values, messaging behaviors, and/or messaging activities that fall within a defined acceptable range or distance of one or more message initiating user attribute values. In at least some implementations, one or more user attribute values logically associated with some or all of the of the message responding users may match or be within an acceptable defined range or distance that is considered compatible with one or more attribute values logically associated with the message initiating user. In at least some implementations, one or more user attribute values logically associated with some or all of the of the message responding users may match or be within an acceptable defined range or distance that is considered complimentary to one or more attribute values logically associated with the message initiating user.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

FIG. 1 shows a networked environment 100 in which matching services are provided via a network 124 to a plurality of Website users 112a-112n (only six shown, collectively "users 112") by a matching service entity 102, according to one illustrated embodiment. The matching service entity 102 is communicably coupled 148 to a machine learning system 150 that, although depicted separately in FIG. 1, may be included or otherwise physically and/or logically incorporated into the matching service entity 102. Each user 112a-112n has a respective logically associated user profile 114a-114n (collectively, "user profile 114") that includes any number of user profile attributes.

A user 112a communicates with both the matching service entity 102 and other users 112b-112n via the transmission or exchange of electronic messages between user processor-based devices 120a-120n (collectively, "processor-based devices 120"). Such processor-based devices 120 may include any form of processor-based device capable of electronic communication. Non-limiting examples of such processor-based devices include, desktop computers, portable computers, laptop computers, ultraportable computers, tablet computers, gaming consoles, wearable computers, and smartphones. To accommodate the receipt of inbound electronic messages 117a-117n (collectively, "inbound messages 117"), a nontransitory storage location, such as a virtual inbox 116a-116n (collectively, "inbox 116") is logically associated with each user 112a-112n. To accommodate the transmission of outbound electronic messages 119a-119n (collectively, "outbound messages 119"), a nontransitory storage location, such as a virtual outbox 118a-118n (collectively, "outbox 118") is logically associated with each user 112a-112n. At times, all or a portion of the contents of a user's 112 inbox 116 and/or outbox 118 may be retained locally on one or more processor-based devices 120. At times, all or a portion of the contents of a user's 112 inbox 116 and/or outbox 118 may be retained remotely, for example by the matching service entity 102. At other times, all or a portion of the contents of a user's 112 inbox 116 and/or outbox 118 may be retained in whole or in part both locally on one or more processor-based devices 120 and remotely by the matching service entity 102.

The matching service entity 102 includes one or more processors and/or control circuits 104 (collectively, "processors 104") and communicably coupled nontransitory storage media 106. In at least some implementations, the matching service entity 102 provides internal message exchange services that facilitate the transmission and/or exchange of all or a portion of the inbound electronic messages 117 and outbound electronic messages 119 between users 112. In other instances, the message exchange or communication services between users 112 may be facilitated by an external entity such as one or more third-party providers (e.g., one or more electronic mail, electronic messaging, or e-mail service) that may or may not be affiliated with the matching service entity 102. Any such internal and/or external message exchange service may be used to facilitate messaging between users 112, provided the matching service entity 102 is able access and/or receive data indicative of at least a portion of the inbound electronic messages 117 and outbound electronic messages 119 logically associated with all or a portion of the users 112.

The nontransitory storage media 106 contains at least a user profile database or data store 108 used to store, retain, or otherwise maintain some or all of the user profile information 114 self-reported by each of the users 112. Such self-reported user profile information may include, but is not limited to: a user's age, a user's gender, a user's country of residence, a user's nationality, a user's ethnicity, a user's profession, a user's physical characteristics (e.g., height, weight, hair color, eye color, build, and the like), a user's interests, a user's activities, a user's hobbies, or any other information useful for identifying potential matches by the matching service entity 102.

The nontransitory storage media 106 contains at least a user profile database or data store 108 used to store, retain, or otherwise maintain some or all of the user profile information 114 collected autonomously or semi-autonomously by the matching service entity 102 or at the direction or control of the matching service entity 102. Such autonomously collected information may include, but is not limited to: an identifier unique to the user's processor-based device 120, a user's geolocation (e.g., determined using a global positioning system), cookies present on a user's processor-based device 120, the operating system of a user's processor-based device 120, software present on a user's processor based device 120, a browsing history of one or more Web browsers on a user's processor-based device 120, and the like. In at least some instances, such autonomously collected information may include data collected from one or more third party applications such as the "Ugly Meter" application available through the Apple® and Google® Play app-stores or Websites such as "Hot or Not" that purport to provide a numerical rating or similar output indicative of a user's physical attractiveness or beauty.

The nontransitory storage media 106 also contains at least a user messaging database or data store 110 used to store, retain, or otherwise maintain some or all of the inbound electronic messages 117 and/or outbound electronic messages 119 communicated by at least a portion of the users 112 of the matching service entity 102. In at least some implementations, due to the volume of user messages generated, the user messaging database 110 may retain user messages for only a limited time period (e.g., one month, one year, five years).

Messaging between users 112 of the matching service entity 102 plays an important role in the formation of relationships between users 112. Additionally, the volume and quality of messages exchanged between users 112 provides the matching service entity 102 with a real time or a near-real time measure of the success and vitality of the services provided to the users 112. As such, the matching service entity 102 may monitor a number of parameters associated with the receipt of inbound messages 117 and/or transmission of outbound messages 119 by some or all of the users 112. Such parametric data may include statistical information such as: number of transmitted outbound electronic messages 117, rate of transmission of outbound electronic messages 117 (e.g., outbound electronic messages 117 transmitted per hour or similar), number of received inbound electronic messages 119, and rate of receipt of inbound electronic messages 119 (e.g., inbound electronic messages 119 received per hour or similar). Such parametric data may include user data such as: shortest, average, and longest times required to respond to a received inbound electronic message 117, shortest, average, and longest intervals between accessing electronic messaging services; and, shortest, average, and longest intervals between accessing one or more matching service entity services. In some instances, the matching service entity 102 may also autonomously monitor, store, retain, or otherwise maintain in the messaging and behavior database 110 at least a portion of the content of some or all of the inbound electronic messages 117 and/or outbound electronic messages 119.

For machine learning system training, the combined user messaging and user behavior data collected and stored in the messaging and behavior database 110 and the user profile information stored in the profile database 108 represents a significant repository of raw data representative of various user profile attributes and user communication preferences. By training the machine learning system 150 using even just a portion of this raw data, patterns and predictive models indicative of user matches and potential candidates may be generated. For example, the machine learning system 150 can generate, develop, or otherwise identify one or more response predictive algorithms 170 advantageously able to predict with a reasonably high degree of certainty a user 112 having a logically associated user profile with whom another user is most likely to exchange electronic messages. To facilitate this analysis, on a periodic, intermittent, or continuous basis, the matching service entity 102 generates or otherwise compiles one or more message data sets 130*a*-130*b* (any number possible, only two shown, collectively, "message data sets 130") and communicates the message data sets 130 to the machine learning system 150 via communicable coupling 140.

Each of the message data sets 130 includes for a number of users 112, data indicative of user profile information 114 which may or may not personally identify the particular user 112 with whom the profile data 114 is logically associated. In some instances, users 112 are randomly selected by the either the matching service entity 102 or the machine learning system 150 for inclusion in one or more message data sets 130. In other instances, users 112 who have received a first defined minimum number of incoming electronic messages 117 and/or responded to a second defined minimum number of incoming electronic messages 117 are selected by the either the matching service entity 102 or the machine learning system 150 for inclusion in one or more message data sets 130.

For each user 112 included in the message data set 130, data indicative of user messaging behavior logically associated with the respective user 112 is included. Additionally, for each user 112 included in the message data set 130, data indicative of user messaging logically associated with the respective user 112 is also included. Thus, for each user 112 included in a messaging data set 130, data indicative of at least a portion of the user profile 114 logically associated with the respective user 112, data indicative of the user messaging behavior logically associated with the respective user 112, and data indicative of the user messaging logically associated with the respective user 112 is included.

Either the matching service entity 102 or the machine learning systems 150 divides, splits equally or unequally, or otherwise separates the user data contained in each of the message data sets 130a-130b into respective training data sets 132a-132b (collectively, "training data sets 132") and test data sets 134a-134b (collectively, "test data sets 134"). The training data sets 132 are used to train the machine learning system 150 in formulating and/or developing one or more response prediction models 170. The test data sets 134 are used to test the accuracy, reliability, and predictability of the respective response prediction models 170 formulated and/or developed by the machine learning system 150.

In at least some implementations, a message data set 130 may be randomly split or otherwise randomly equally or unequally separated into a training data set 132 and a test data set 134 in which data logically associated with a single matching service entity user 112 appears in both the training data set 132 and the test data set 134 (i.e., non-mutually exclusive training and test data sets). Such a non-mutually exclusive splitting or separation generally produces a relatively more customized response prediction model 170 that may tend toward user-specificity.

In at least some implementations, a message data set 130 may be randomly split or otherwise randomly equally or unequally separates into a training data set 132 and a test data set 134 in which data logically associated with a single matching service entity user 112 appears in either the training data set 132 or the test data set 134 (i.e., mutually exclusive training and test data sets). Such mutually exclusive splitting or separation generally produces a relatively less customized response prediction model 170 that may tend toward generality.

The message data sets 130 are received at an input layer 152 of the machine learning system 150. During one or more training epochs, a number of training data sets 132 are provided to the response predictive model generation layer 154 of the machine learning system 150. During one or more initial training epochs, the training data sets 132 may be used to form, define, delineate, construct, organize, and/or weight, connections or similar communicative and/or operable couplings within the machine learning system 150. During one or more subsequent training epochs, the training data sets 132 may be used to re-form, re-define, re-delineate, re-construct, re-organize, and/or re-weight the connections or similar communicative and/or operable couplings within the machine learning system 150. Test data sets 134 are provided to the machine learning system 150 to test the accuracy of each of the number of response predictive models 170 generated by the machine learning system 150.

Based on the supplied training data sets 132, the machine learning system 150 produces one or more response predictive models 170 indicative of the likelihood that two users 112 will form a pairing based on the user profiles 114 logically associated with the users 112, the messaging behavior logically associated with the users 112, and the messaging logically associated with the users 112. In at least some implementations, the results from each of the one or more response prediction models 170 generated by the test data sets 134 are compared and the response prediction models 170 demonstrating the highest accuracy when compared to test data set results are selected or otherwise chosen by the matching service entity 102 and/or the machine learning system 150 for run-time implementation. In at least some implementations, the one or more response predictive models 170 selected or otherwise chosen by the matching service entity 102 and/or the machine learning system 150 are communicated by an output layer 156 of the machine learning system 150 to the matching service entity 102 via one or more communicable couplings 180.

During run-time operation, the machine learning system 150 and/or the matching service entity 102 uses the one or more selected response predictive models 170 to generate or otherwise provide data such as compatibility scores, indices, or ratings indicative of the likelihood that a particular user 112a will respond to a message received from another user 112b. Such may be based at least in part on the user profile 114b logically associated with user 112b in light of the user profiles 114 logically associated with other users 112 to whom user 112a has responded and in light of the messaging activities and behaviors logically associated with user 112a. The ability to identify users 112 to whom a particular user 112a is likely to respond advantageously provides the matching service entity 102 with input data relevant in identifying one or more matches and/or one or more potential matches for the particular user 112a. Such data may be used by the matching service entity 102 to develop one or more compatibility scores, indices, or ratings suitable for quantifying and identifying compatibility and/or quantifying and identifying a likelihood of formation of a successful pairing between users 112 based on the user profiles 114 logically associated with the users 112, the messaging behavior logically associated with the users 112, and the messaging logically associated with the users 112.

In at least some instances, actual message response data between users 112, including users 112a, 112b for which the response predictive model 170 indicated a high likelihood or probability of user 112b responding to an initial message from user 112a, may be back propagated or otherwise communicated by the matching service entity 102 to the machine learning system 150. Responsive to the receipt of such back propagated data, the response predictive model generation layer 154 may re-form, re-define, re-delineate, re-construct, re-organize, and/or adjust the weights of one or more connections forming one or more response predictive models 170.

Figure 2:
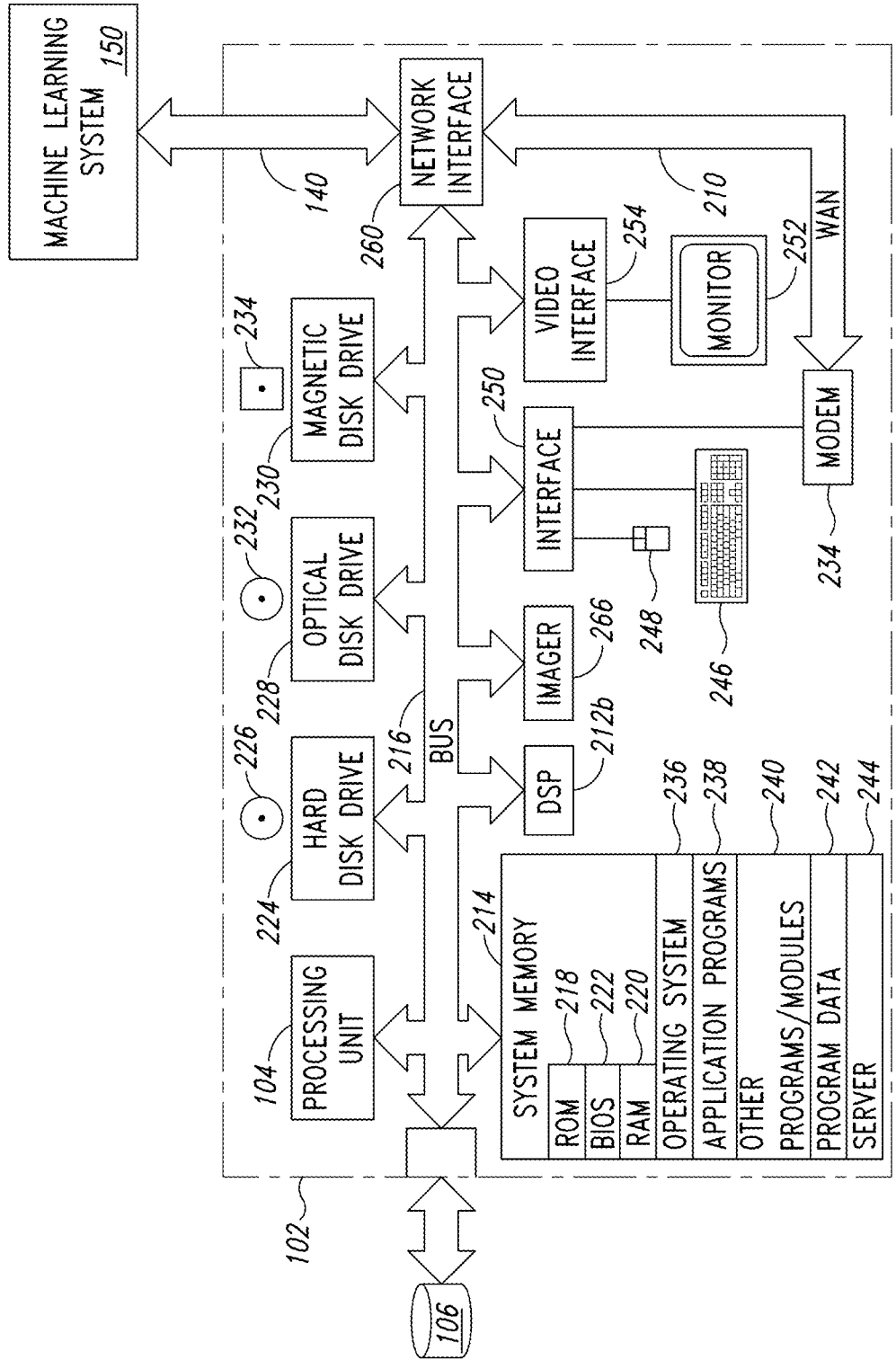
FIG. 2 is a functional block diagram of a matching service entity 102 communicably coupled to a machine learning system capable of providing one or more response predictive models in response to the receipt of training data sets from the matching service entity, according to one illustrated embodiment.

FIG. 2 shows a matching service environment 200 comprising one or more matching service entities 102 that includes one or more processing units 104 (only one illustrated) and one or more associated nontransitory machine-readable storage media 106 (only one illustrated). The associated nontransitory computer- or processor-readable storage media 106 is communicatively coupled to the matching service entity 102 via one or more communications channels, for example one or more parallel cables, serial cables, or wireless network channels capable of high speed communications, for instance via Universal Serial Bus ("USB") 3.0 or via Thunderbolt®.

Although the matching service entity 102 is described herein in the context of a standalone system, the matching service entity 102 may, in fact, constitute only a portion of a larger entity, for example a relationship building Website or similar entity. In such instances, components, sub-systems, and resources described forming all or a portion of the matching service entity 102 should be understood as components, sub-systems, and resources that are shared with the relationship building Website or one or more common systems and/or resources that are allocated between the relationship building Website and the matching service entity 102.

The matching service environment 200 may employ other computer systems and network equipment, for example additional servers, cloud computing services, proxy servers, firewalls, routers and/or bridges. The matching service entity 102 will at times be referred to in the singular herein, but this is not intended to limit the embodiments to a single device since in typical embodiments there may be more than one matching service entity 102 used. Unless described otherwise, the construction and operation of the various blocks shown in FIG. 2 are of conventional design. As a result, such blocks need not be described in further detail herein, as they will be understood by those skilled in the relevant art.

The matching service entity 102 may include one or more processors, logic circuits, and/or processing units 104, a system memory 214 and a system bus 216 that couples various system components including the system memory 214 to the processing units 104. The processing units 104 may be any logic processing unit, such as one or more single or multi-core or processor microprocessors, central processing units (CPUs), digital signal processors (DSPs), application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the credit-based message exchange system 104, such as during start-up.

The matching service entity 102 may optionally include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 104 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the matching service entity 102. Although the depicted credit-based message exchange system 104 is illustrated employing a hard disk 224, optical disk 228 and magnetic disk 230, those skilled in the relevant arts will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules are stored at least in part in the system memory 214. Program modules may include the matching service entity matching algorithms, operating system 236, one or more application programs 238, other programs or modules 240 and program data 242. One or more application programs 238 may include one or more sets of logic or processor-readable instruction sets that cause the processor(s) 104 to provide a system that enhances messaging between users 112 of the matching service entity 102 by forming one or more messaging data sets 130 and organizing by splitting or otherwise equally or unequally apportioning the messaging data sets into at least one training data set 132 and at least one test data set 134. The processor-readable instruction sets can further cause the processor 104 to communicate the training data sets 132 to a machine learning system 150, such as a neural network, to generate one or more response predictive models 170 that provide an output indicative of the likelihood that a particular user will respond to an initial message received from another user logically associated with a defined set of user profile attributes. The processor-readable instruction sets can further cause the processor to communicate the test data sets to a machine learning system 150 to test the accuracy of and/or the confidence in the output data provided by the one or more response predictive models 170.

One or more application programs 238 may include one or more sets of logic or processor-readable instruction sets that cause the processor(s) 104 to select user profile attribute data, user messaging activity data, and/or user messaging behavior data for inclusion in one or more messaging data sets 130 used to provide training data sets 132 and test data sets 134 to one or more communicably coupled machine learning systems 150. In at least some implementations, the processor-readable instruction sets cause the processor 104 to randomly select users from the user population of the matching service entity 102. In such instances, some or all of the user profile attribute data, user message activity, and/or user message behavior logically associated with each of the randomly selected users is included in the messaging data set 130. In at least some implementations, the processor-readable instruction sets cause the processor 104 to randomly (e.g., pseudo-randomly) select from a reduced set or sub-set of users who meet one or more defined criteria. In a first example, the processor 104 may select users from a sub-set of users who have received more than a first threshold number of inbound electronic messages 117 and/or responded via an outbound electronic message 119 to more than a second threshold number of inbound electronic messages 117. In another example, the processor 104 may select users from a sub-set of users who have one or more defined user profile attributes, such as a user profile gender attribute indicative of a female user.

One or more application programs 238 may include one or more sets of logic or processor-readable instruction sets that cause the processor(s) 104 to select user profile attribute data, user messaging activity data, and/or user messaging behavior data for inclusion on a message-by-message basis in one or more messaging data sets 130 used to provide training data sets 132 and test data sets 134 to one or more communicably coupled machine learning systems 150. In at least some implementations, the processor-readable instruction sets cause the processor 104 to randomly (e.g., pseudo-randomly) select users from the user population of the matching service entity 102. In such instances, some or all of the user profile attribute data, user message activity, and/or user message behavior logically associated with each of the randomly selected users is included on a message-by-message basis in the messaging data set 130.

One or more application programs 238 may include one or more sets of logic or processor-readable instruction sets that cause the processor(s) 104 to select user profile attribute data, user messaging activity data, and/or user messaging behavior data for inclusion in one or more messaging data sets 130 used to provide training data sets 132 and test data sets 134 that are not mutually exclusive with respect to the users included in a training data set 132 and a test data set 134 (i.e., the processor 104 separates the massage data set 130 such that the same user may, but is not required, to appear in both the training data set 132 and the test data set 134). In some instances, the one or more sets of logic or processor-readable instruction sets may cause the processor(s) 104 to create non-mutually exclusive training data sets 132 and test data sets 134 (i.e., training and test data sets in which the same user may, but is not required, to appear in both the training data set 132 and the test data set 134). In other instances, the one or more sets of logic or processor-readable instruction sets may cause the processor(s) 104 to create mutually exclusive training data sets 132 and test data sets 134 (i.e., training and test data sets in which the same user does not appear in both the training data set 132 and the test data set 134).

One or more application programs 238 may include one or more sets of logic or processor-readable instruction sets that cause the processor(s) 104 to, for example find a global minimum of a solution space to the machine learning system 150. For example, suitable systems and computational techniques may include any one or more of: support vector machines, random forests, tree models, Bayesian learners, random ferns, decision trees, OneR, recursive partitioning, regression trees, rule induction, logistic Gaussian process, discriminant analysis, and general neural nets including back propagation and back propagation with momentum.

A support vector machine performs classification by constructing an N-dimensional hyperplane that optimally separates the data into two categories. The support vector machine attempts to find the line that is oriented such that the margin between the support vectors is maximized. The support vector machine tries to find a kernel function to map the examples as points in higher space so that the examples of the separate categories are divided by a clear gap that is as wide as possible. New examples are then mapped into that same space and predicted to belong to a category based on which side of the gap the new examples fall.

Working as a classification model, random forests grows many classification trees. To classify a new object from an input vector, the input vector is put down each of the trees in the forest. Each tree gives a classification that "votes" for a certain class. The forest chooses the classification having the most votes over all the trees in the forest. Unlike single decision trees, which are likely to suffer from high variance or high bias, random forests use averaging to find a natural balance between the two extremes.

Random ferns is a faster and simpler alternative to the random forest algorithm by extending the randomness and simplicity. A fern can be thought of as a constrained tree where the same binary test is performed at each level. Random Ferns usually uses Bayesian methods for the split at the nodes.

A Naive Bayes classifier is a simple probabilistic classifier based on applying Bayes' theorem with strong (naive) independence assumptions. A more descriptive term for the underlying probability model would be 'independent feature model'. The advantage of the Naive Bayes classifier is that it only requires a small amount of training data to estimate the means and variances of the variables necessary for classification.

Decision tree techniques find data features and thresholds that best splits the data into separate classes. This is repeated recursively until data has been split into homogeneous (or mostly homogeneous) groups. This allows the features that are most important to be immediately identified.

OneR is a simple classification algorithm that generates a one-level decision tree. OneR is able to infer typically simple, yet accurate, classification rules from a set of instances. The OneR algorithm creates one rule for each attribute in the training data, then selects the rule with the smallest error rate as its 'one rule'. To create a rule for an attribute, the most frequent class for each attribute value must be determined. The most frequent class is simply the class that appears most often for that attribute value.

A Regression Tree technique attempts to predict a continuous numerical value rather than a discrete classification. Regression trees do not have classes, instead there are response vectors which represent the response values for each observation in input vector. Since regression trees do not have pre-assigned classes, classification splitting in regression trees is made in accordance with squared residuals minimization algorithm which implies that expected sum variances for two resulting nodes should be minimized.

A rule induction algorithm learns a pruned set of rules with respect to the information gain from the given training set. Starting with the less prevalent classes, the algorithm iteratively grows and prunes rules until there are no positive examples left or the error rate is greater than a predefined threshold.

Logistic Gaussian processes are a natural way of specifying prior distributions over functions of one or more input variables. When such a function defines the mean response in a regression model with Gaussian errors, inference can be done using matrix computations. The covariance function of the Gaussian process can be given a hierarchical prior, which allows the model to discover high-level properties of the data, such as which inputs are relevant to predicting the response. Inference for these covariance hyper parameters can be done using Markov chain sampling. Classification models can be defined using Gaussian processes for underlying latent values, which can also be sampled within the Markov chain.

Discriminant analysis tries to find the linear combination of features which best separate two or more classes of examples. The resulting combination is then used as a linear classifier. Discriminant analysis is used to determine which variables discriminate between two or more naturally occurring groups, and may have a descriptive or a predictive objective.

General neural nets may employ back-propagation. The back propagation ("backward propagation of errors") algorithm, is a multi-layer feedforward network trained according to error back propagation algorithm and is one of the most common methods of training neural networks. A backward propagation network can be used to learn and store a great amount of mapping relations of input-output model, while unnecessary to disclose in advance the mathematical equation that describes these mapping relations. The gradient descent learning rule may be applied, in which the back propagation is used to regulate the weight value and threshold value of the network to achieve the minimum error sum of square.

Neural nets may also employ back propagation with momentum. Back propagation with momentum updating is one of the most popular modifications to prevent weights update from oscillating. The idea of the algorithm is to update the weights in the direction which is a linear combination of the current gradient of the instantaneous error surface and the one obtained in the previous step of the training.

The application programs 238 may implement any one or more of the above described techniques, for instance a neural network with back propagation. For example, in some instances, data representative of the responses communicated by users 112 may be provided to the machine learning system 150. Such data may be used within the response predictive model layer 154 to adjust one or more model parameters to reflect actual outcomes. For example, where the response predictive model layer 154 includes a neural network, connection weights may be altered (i.e., weakened or strengthened) in a manner reflecting the actual messaging between two users 112.

One or more application programs 238 may include one or more sets of logic or processor-readable instruction sets that cause the processor(s) 104 to incorporate the output provided by one or more response predictive models 170 into one or more match selection processes used by the matching service entity 102 to select matches and potential candidates for presentation to users 112. In at least some implementations such match selection processes may be executed by the matching service entity 102 upon receipt of a new user registration to identify those users 112 that provide either matches or potential candidates for the new user 112 and that present the greatest likelihood of responding to an initial message provided by the new user 112. In at least some implementations such match selection processes may be executed intermittently, periodically, or continuously on all or a portion of the user population of the matching service entity 102 to identify those users 112 that provide either a match or potential candidate match for the other users 112 and that present the greatest likelihood of responding to an initial message provided by the new user 112. Such repeated application of matching or candidate selection processes by the matching service entity 102 may advantageously identify matches and potential candidates that were not identified by earlier iterations of at least the one or more response predictive models 170.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the matching service entity 102 using one or more input devices such as a touch screen or keyboard 246 and/or a pointing device such as a mouse 248, and/or via a graphical user interface. Other input devices can include a microphone, joystick, game pad, tablet, scanner, etc. These and other input devices are connected to the processor 104 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The matching service entity 102 can include other output devices, such as speakers, printers, etc.

Figure 3:
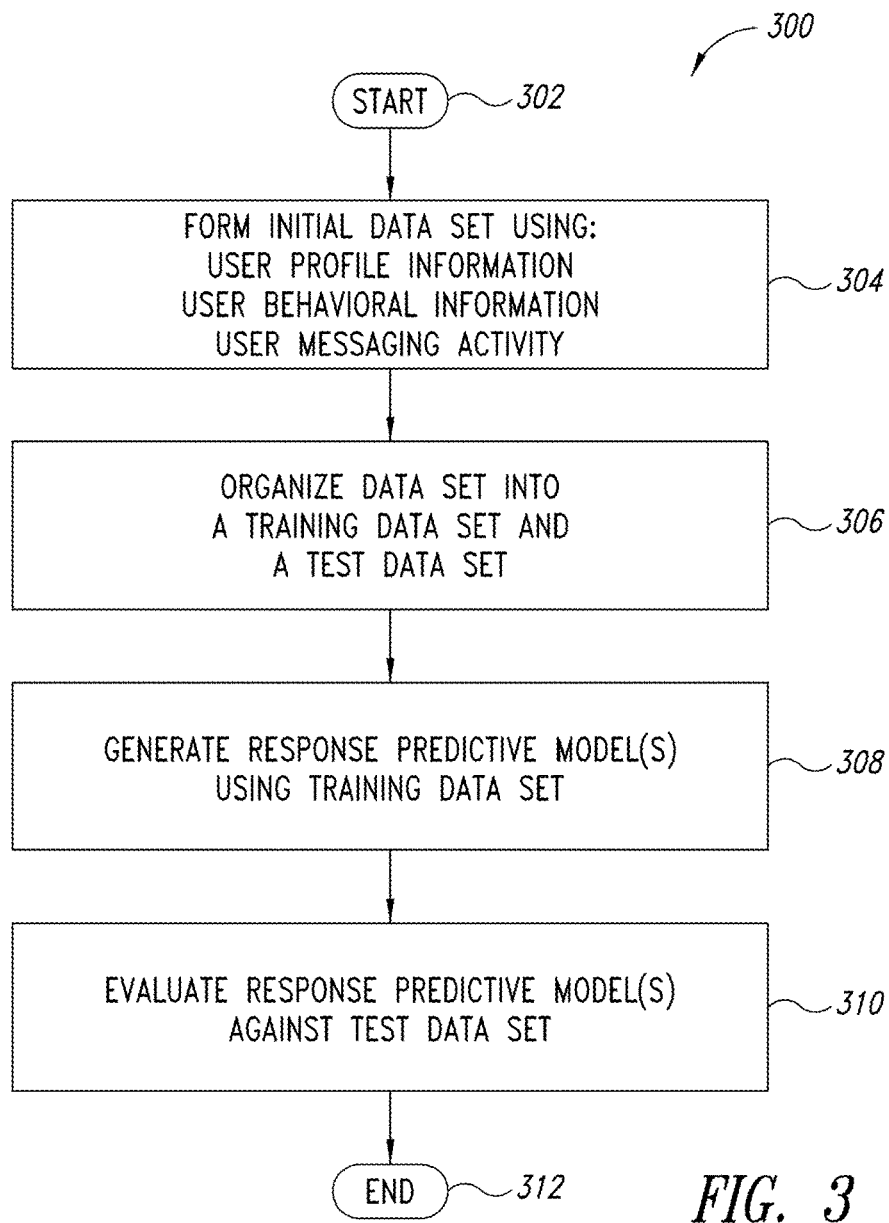
FIG. 3 is a flow diagram showing a high-level method of forming a training data set and a test data set useful for developing and testing one or more response predictive models, according to one illustrated embodiment.

FIG. 3 shows a high-level method of collecting user data to generate message data sets 130 and splitting or otherwise separating the collected user data into a training data set 132 for training the machine learning system 150 and a test data set to test the accuracy of one or more response predictive models 170 generated by the machine learning system 150, according to one illustrated embodiment. Generally, user profile, behavior, and messaging data is collected to provide a message data set 130 that is split or otherwise separated into a training data set 132 and a test data set 134. The training data set 132 is provided to the machine learning system 150 which uses the training data to generate one or more response prediction models 170. The test data set 134 is used to validate or confirm the accuracy of the one or more response prediction models 170. The method 200 of generating one or more response predictive models 170 using a machine learning system 150 commences at 302.

At 304, one or more message data sets 130 are generated using data indicative of one or more attributes included in a user profile 114, data indicative of user behavior, and data indicative of user messaging. In some implementations, all or a portion of the data indicative of one or more attributes included in a user profile 114 may be retrieved or otherwise obtained by the matching service entity 102 and/or the machine learning system 150 from one or more user profile databases 108. In some implementations, all or a portion of the data indicative of user behavior and user messaging may be retrieved or otherwise obtained by the matching service entity 102 and/or the machine learning system 150 from one or more user behavior and messaging databases 110.

The retrieved or otherwise obtained user attribute, behavior and messaging data may be logically associated with an identifier representative of the respective user 112 with whom the data is logically associated. In some instances, the identifier representative of the respective user may include all or a portion of the name of the respective user 112 (e.g., all data included in the messaging data set for user "Jane Doe" is logically associated with "Jane Doe"). In some instances, the identifier representative of the respective user may include all or a portion of an identifier that maintains the anonymity of the respective user 112 (e.g., all data included in the messaging data set for user "A1" is logically associated with "A1"). In some instances, the messaging data associated with a particular user 112 may be retrieved collectively (e.g., 35 outbound electronic message 119 responses were communicated to males age 25-29) or may be retrieved on a message-by-message (e.g., outbound electronic message 119 response #1 was communicated to a male age 25; response #2 was communicated to a male age 27, and so on) basis.

In some instances, user profile, behavior, and messaging data logically associated with random users 112 is used to form some or all of the message data sets 130. In other instances, user profile, behavior, and messaging data logically associated with users 112 meeting one or more defined criteria is used to form some or all of the message data sets 130.

At 306, each of the message data sets 130 is split, divided, or otherwise evenly or unevenly separated into a training data set 132 and a test data set 134. In at least some instances, some or all of the users represented in the message data sets 130 are randomly split, divided, or otherwise evenly or unevenly separated into a training data set 132 and a test data set 134 using one or more defined criteria.

At 308, at least a portion of the training data sets 132 are provided to the machine learning system 150 to form, define, delineate, construct, organize, and/or weight, connections or similar communicative and/or operable couplings within the machine learning system 150 to provide the one or more response predictive models 170. Such response predictive models 170 provide one or more outputs indicative of the likelihood that a first user 112*a* will respond via an outbound electronic message 119 to an inbound electronic message 117 received from a second user 112*b*.

The ability to predict the likelihood that the first user 112*a* will respond to an initial message received from a second user 112*b* is significant because users of the matching service entity 102 may grow frustrated with the matching service entity 102 or may have a very low perceived value of the matching service entity 102 if a large proportion of the initial messages they communicate to other recipient users recommended by the matching service entity as providing either a match or a potential candidate match go unanswered. By providing a user 112 with matches and potential candidates likely to respond to an incoming electronic message 117 generated by the respective user 112, such feelings of frustration and perceived lack of value in the matching service entity 102 can be advantageously reduced or even eliminated.

At 310, one or more response prediction models 170 generated by the machine learning system 170 are tested using at least a portion of the test data sets 134. Some or all of the test data sets 134 are validated based on actual historical messaging data (i.e., user 112a did respond to an initial message received from user 112b), to determine the accuracy or confidence level of each of the one or more response prediction models 170. Those response prediction models 170 providing accuracy or confidence levels at or above a defined threshold may be subsequently used in one or more processes for identifying and/or recommending matches or potential candidates for users 112 of the matching service entity 102. For example, when a new user 112n joins the matching service entity 102, they may be provided with matches or potential candidates identified and/or recommended by the matching service entity 102 based at least in part on users 112 who have responded to initial messages from other prior users 112 having a profile 114 similar to the new user's profile. The method 200 of generating one or more response predictive models 170 using a machine learning system 150 concludes at 312.

Figure 4:
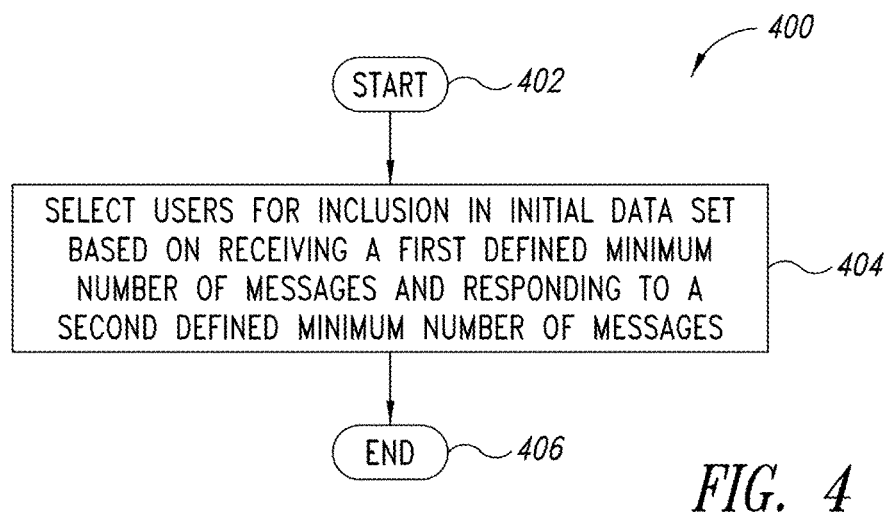
FIG. 4 is a flow diagram showing a low-level method of identifying potential user profile attribute data, user messaging data, and user messaging behavior data for inclusion in at least one of a training data set or a test data set based on the respective user receiving in excess of a first defined number of messages and responding to in excess of a second defined number of messages, according to one illustrated embodiment.

FIG. 4 shows a low-level method 400 of selecting users 112 whose profile, behavioral, and message data will be included in one or more message data sets 130, according to one illustrated embodiment. The composition of the message data sets 130 has an impact on the overall accuracy of the resultant response predictive models 170 provided by the machine learning system 150. For example, selecting new users or users who use the messaging services provided by the matching service entity 102 only on an infrequent basis may tend to skew one or more response predictive models 170 generated by the machine learning system 150, thereby reducing the overall accuracy of and/or confidence in the one or more response predictive models 170. The method of selecting users 112 whose profile, behavioral, and message data will be included in one or more message data sets 130 commences at 402.

At 404, data indicative of user profile attributes, user messaging behavior, and user messaging activity for each of a number of respective users 112 is selected for inclusion in one or more message data sets 130 based or contingent upon the user 112 logically associated with the user profile attributes, messaging behavior, and messaging activity having received a first defined minimum number of incoming electronic messages 117, and responding to a second defined minimum number of incoming electronic messages 117. In at least some implementations the second defined minimum number of incoming electronic messages 117 may be specified as a percentage of the first defined minimum number of incoming electronic messages 117. For example, a user's profile attribute data, messaging behavior data, and messaging activity data may be included in one or more message data sets 130 if the user has received more than ten incoming electronic messages 117 (i.e., the first defined minimum number) and has responded to at least 50% (i.e., 50% of ten incoming electronic messages, or five) of the incoming electronic messages 117 (i.e., the second defined minimum number).

In some instances, all users 112 meeting the defined criteria are included in one or more message data sets 130. In other instances, all users meeting the defined criteria are qualified as candidates for potential inclusion in one or more message data sets 130 subject to additional selection criteria and/or random selection criteria applied by the matching service entity 102. The method of selecting users 112 whose profile, behavioral, and message data will be included in one or more message data sets 130 concludes at 406.

Figure 5:
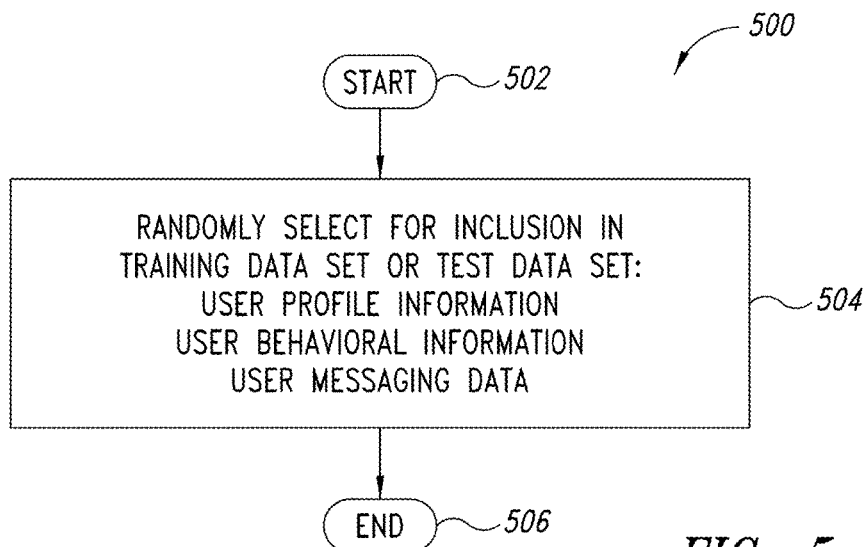
FIG. 5 is a flow diagram showing a low-level method of randomly identifying on a message-by-message basis potential user profile attribute data, user messaging data, and user messaging behavior data for inclusion in at least one of a training data set or a test data set, according to one illustrated embodiment.

FIG. 5 shows a low-level method 500 of randomly (e.g., pseudo-randomly) selecting users 112 whose profile attribute data, messaging behavior data, and messaging activity data will be included in one or more message data sets 130, according to one illustrated embodiment. In some implementations, information may be clustered, for example information regarding certain users or users belonging to a defined demographic (e.g., females between 20 and 24 years old, living in Vancouver, B.C.). All profile attribute data, messaging behavior data, and messaging activity data for corresponding users may, for instance be included in the training data set In some implementations, the system may sort each user, user-by-user, such that all of a given user's messages are made part of either the training set or the test set, which allows generation of meaningful results with allow accurate prediction of reply rate. Alternatively, in at least some implementations, the inclusion of user profile and behavioral data on a message-by-message basis may provide a higher degree of accuracy and/or confidence in the response predictive models 170 generated by the machine learnings system 150 due to the more granular nature of the training data. In at least some implementations users may be randomly selected by at least one of the matching service entity 102. The method of randomly selecting users 112 whose profile, behavioral, and message data will be included in one or more message data sets 130 commences at 502.

At 504, user profile, behavior, and messaging data is randomly selected for inclusion in one or more message data sets 130. In at least some instances, such selection may be performed using a reduced candidate user pool, for example a candidate user pool based upon or contingent upon the respective user 112 logically associated with the user profile, behavior, and messaging data having received a first defined minimum number of incoming electronic messages 117, and responding to a second defined minimum number of incoming electronic messages 117. The method of randomly selecting users 112 whose profile, behavioral, and message data will be included in one or more message data sets 130 concludes at 506.

Figure 6:
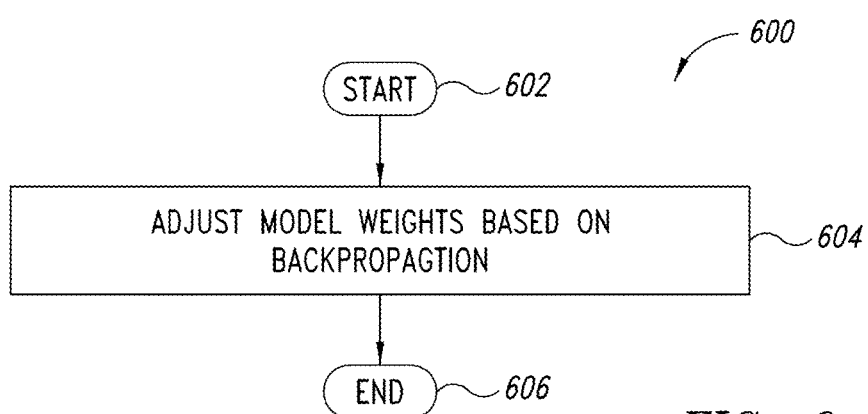
FIG. 6 is a flow diagram showing a low-level method of adjusting response predictive model weights based on back propagation of data user response data to a machine learning system response predictive model generation layer, according to one illustrated embodiment.

FIG. 6 shows a low-level method 600 of adjusting one or more response predictive model 170 parameters, for example response predictive model 170 neural network connection weights, based at least in part on back propagation of data from the matching service entity 102 to the machine learning system 150, according to one illustrated embodiment. As described elsewhere herein, other machine learning techniques may be employed in place of, or in conjunction with neural networks and/or back propagation techniques.

The output generated by the one or more response predictive models 170 is compared against actual initial message response data associated with the users 112 included in the test data set 134. At least a portion of the data generated as a result of this comparison (i.e., the comparison of a predicted user response versus the actual user response) may be back propagated to the machine learning system 150. In at least some implementations, the back propagation of such data to the response predictive model generation layer 154 of the machine learning system 150 can improve the accuracy of and/or the confidence in the one or more response predictive models 170. For example, where the response predictive model layer 154 includes a neural network, the back propagation of data to the neural network may result in the adjustment of connection weights within the model. The method 600 of adjusting one or more response predictive model 170 parameters, for example response predictive model 170 neural network connection weights, based on back propagation of data, commences at 602.

At 604, data indicative of the success or failure of the response predictive model 170 to identify those users 112 likely to provide a response to an incoming electronic message 117 received from another user 112 is back propagated to the machine learning system 150. Such data may take the form of data indicative of whether a first user 112a predicted by one or more response predictive models 170 to respond to an incoming message from a second user 112b actually does respond to an incoming message from the second user 112b.

As a result of receiving such back propagated data, the machine learning system 150 alters, adjusts, or changes one or more parameters of the one or more response predictive models 170. For example, where the one or more response predictive models 170 include a neural network, the back propagation of data to the neural network may result in the adjustment of one or more connection weights within the neural network. The method 600 of adjusting one or more response predictive model 170 parameters, for example one or more response predictive model 170 neural network connection weights, based on back propagation of data concludes at 606.

Figure 7:
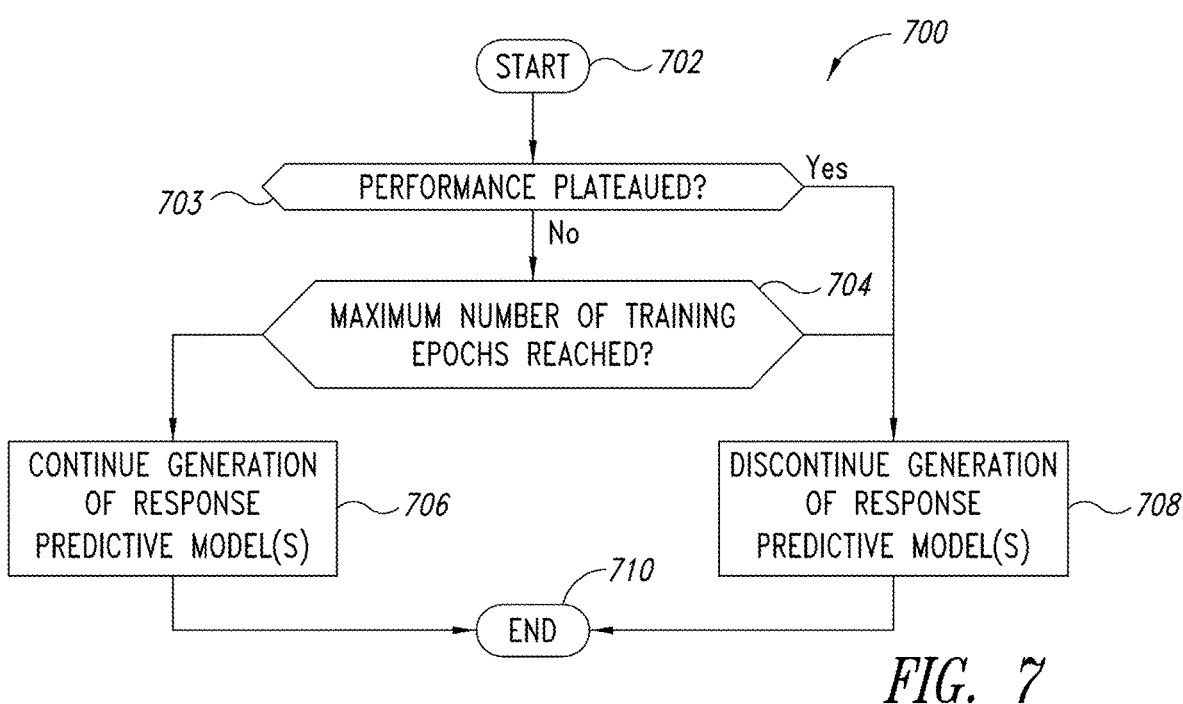
FIG. 7 is a flow diagram showing a low-level method of determining whether to continue or discontinue development, generation, and/or refinement of some or all of the number of response predictive models based on whether the maximum number of training epochs has been reached, according to one illustrated embodiment.

FIG. 7 shows a low-level method 700 of exiting a machine learning system training mode when a performance of a test set on the training set results in a plateaued performance (i.e., reached a global minimum) or optionally when a maximum number of training epochs has been reached, according to one illustrated embodiment. A training epoch includes passing a training data set 132 through the response predictive model generation layer 154 one time. Repeated passages of training data sets 132 through the response predictive model generation layer 154 alters, adjusts, and/or refines one or more parameters of the response predictive model 170. The method 700 of exiting a machine learning system training mode may be based upon the earlier of plateaued performance or optionally based on reaching a maximum number of training epochs, commences at 702.

At 703, the machine learning system 150 determines whether a performance has plateaued. If performance has plateaued, control passes directly to 708 to discontinue generation of response predictive models. If performance has not plateaued, control optionally passes to 704 to determine whether a maximum number of epochs has been reached. The method 700 may repeat, or may repeat without determining whether a maximum number of epochs has been reached depending on the specific implementation.

At 704, the machine learning system 150 determines whether a defined maximum number of training epochs has been reached. In at least some instances, such may be determined by comparing the number of training epochs completed against the defined maximum number of training epochs.

At 706, the machine learning system 150 remains in a training mode continues to train one or more response predictive models 170 using some or all of the training data sets 132 if the machine learning system 150 determined at 704 that the maximum number of training epochs has not been reached.

At 708, the machine learning system 150 exits the training mode if the machine learning system 150 determined at 704 that the maximum number of training epochs has been reached. In at least some instances, after exiting the training mode at 708, the machine learning system 150 may enter a run-time mode. In the run-time mode, the one or more response predictive models 170 are applied against data provided by the matching service entity 102 to the input layer of the machine learning system 150 to generate output at the output layer 156 that is indicative of the likelihood or probability that a first user 112a will respond to an initial message received from a second user 112b. The method 700 of exiting a machine learning system training mode based upon whether a maximum number of training epochs has been reached concludes at 710.

Figure 8:
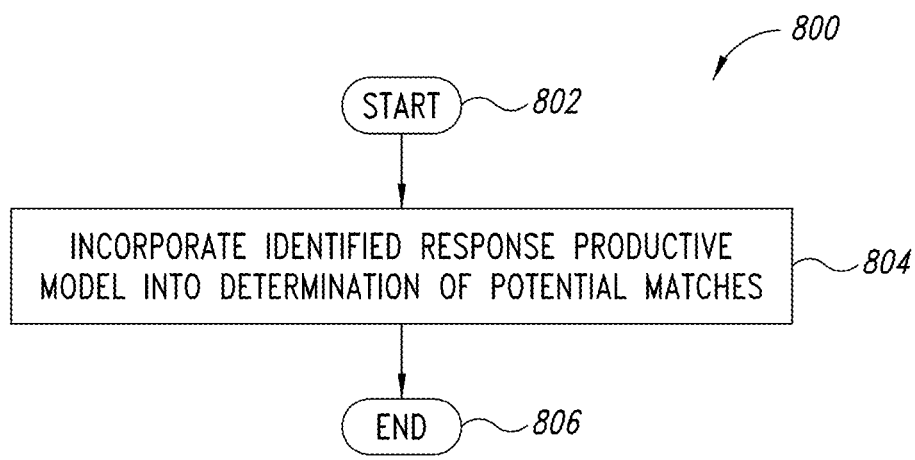
FIG. 8 is a flow diagram showing a low-level method of incorporating one or more identified response predictive models into the identification of user matches and/or potential candidates by a matching service entity such as a relationship building Website, according to one illustrated embodiment.

FIG. 8 shows a low-level method 800 of incorporating the output provided by one or more response predictive models 170 into the identification, selection, and/or determination of matches or potential candidates between users 112 of a matching service entity 102, according to one illustrated embodiment. Generally, matching service entities 102 identify and provide matches or potential candidates to users 112 in an effort to form successful relationships between users 112. The success or failure of a particular matching service entity 102 may, in some instances, be attributed to the level of success or perceived value provided by the matching service entity 102 to its users 112. A first user 112a who transmits initial messages to a number of second user 112b matches or potential candidates but receives few responses is likely to have a low perceived value and may leave the matching service entity 102. Conversely, a first user 112a who transmits initial messages to a number of second user 112b matches or potential candidates and receives numerous responses is likely to have a relatively high perceived value of the matching service entity 102. Thus, identifying as matches or potential candidates those second users 112b who are likely to respond to an initial message transmitted by a first user 112a advantageously increases the first user's perceived value of the matching service entity 102. The method 800 of incorporating one or more response predictive models 170 into a determination of matches or potential candidates between users of a matching service entity 102 commences at 802.

At 804, the matching service entity 102 incorporates output data provided by the one or more response predictive models 170 generated by the machine learning system 150 into identifying matches and/or potential candidates for a user 112. In some instances, the matching service entity 102 provides user data from the user profile database 108 and/or the user behavior and messaging database 110 to the one or more response predictive models 170 on a periodic, intermittent, or continuous basis. In some instances, the matching service entity 102 communicates new user 112 profile data to the one or more response predictive models 170 to identify matches and/or potential candidates for the new user 112. The method 800 of incorporating one or more response predictive models 170 into a determination of matches or potential candidates between users of a matching service entity 102 concludes at 806.

Figure 9:
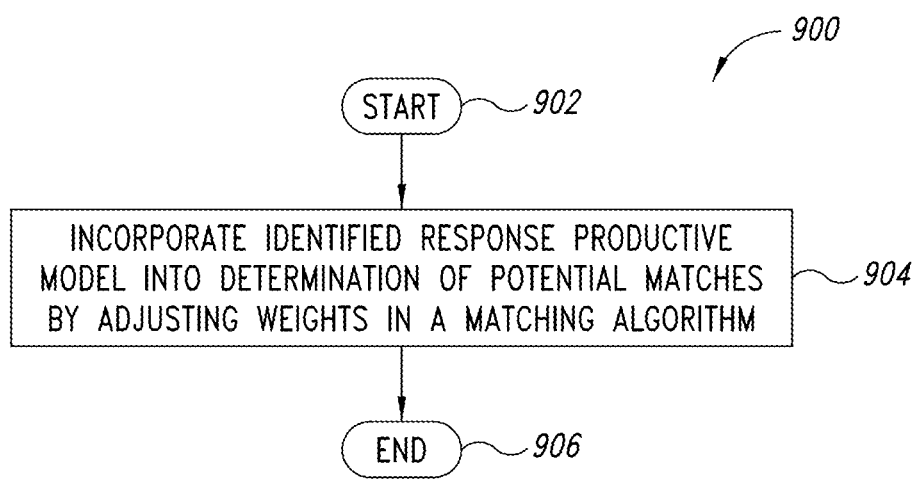
FIG. 9 is a flow diagram showing a low-level method of incorporating the one or more identified response predictive models into a matching algorithm and/or match prediction algorithm and adjusting the weights of the matching algorithm and/or match prediction algorithm to select, determine, or otherwise identify matches and/or potential candidates for a particular user of a matching service entity such as a relationship building Website, according to one illustrated embodiment.

FIG. 9 shows a low-level method 900 of incorporating one or more response predictive models 170 into a determination of matches or potential candidate matches between users of a matching service entity 102 by adjusting weights of one or more matching algorithms applied by the matching service entity 102, according to one illustrated embodiment. The matching service entity 102 applies any number of algorithms to select, determine, and/or identify matches and/or potential candidates for a user 112. In at least some instances, the output data provided by then one or more response predictive models 170 generated by the machine learning system 150 may influence, adjust, or otherwise weight one or more factors included in one or more of the number of matching algorithms used by the matching service entity 102 in the selection, determination, and/or identification of matches and/or potential candidates supplied to a user 112. The method 900 of incorporating one or more response predictive models 170 into a determination of matches or potential candidates between users of a matching service entity 102 by adjusting weights of one or more matching algorithms applied by the matching service entity 102 commences at 902.

At 904, the matching service entity 102 weights one or more factors included in one or more algorithms used to identify matches and potential candidates for a user 112 by incorporating output data provided by the one or more response predictive models 170 generated by the machine learning system 150. The method 900 of incorporating one or more response predictive models 170 into a determination of matches or potential candidate matches between users of a matching service entity 102 by altering, adjusting, or modifying weights and/or weighting factors associated with one or more variables included in one or more matching algorithms applied by the matching service entity 102 concludes at 906.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification including U.S. Provisional Patent Ser. No. 61/914,154, filed Dec. 10, 2013, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a system to enhance messaging between users, comprising:
using a communication network that includes servers, processors, display devices, input devices, and system memory devices to send messages between users and autonomously collect actual historical messaging data;
forming an initial data set, the initial data set including: user profile information for a plurality of users, user behavioral information for at least some of the plurality of users, and message data indicative of messaging activity between at least some of the plurality of users, wherein forming an initial data set comprises selecting users who have received at least a first defined minimum number of messages, and who responded to at least a second defined minimum number of the received messages, and including the user profile information, the user behavioral information, and the messaging data for the selected users in the initial data set;
organizing the initial data set into a training data set and a test data set;
generating a response predictive model using a machine learning system from the training data set that includes the user profile information, the user behavioral information and message data;
evaluating the response predictive model generated from the training data set against the corresponding test data set, wherein at least some of the test data set is based on actual historical messaging data; and
determining an accuracy of the response prediction model using the actual historical messaging data.

2. The method of claim 1 wherein organizing the initial data set into a training data set and a test data set includes separating the initial data set into the training data set and the test data set.

3. The method of claim 1 wherein selecting users further includes selecting only users who have a logically associated attribute value indicative of a female gender.

4. The method of claim 3 wherein organizing the initial data set into a training data set and a test data set includes randomly selecting for inclusion in either the training data set or the test data set the user profile information, the user behavioral information, and the messaging data from all of the selected users on a message-by-message basis.

5. The method of claim 4 wherein the test data set and the training data set are not mutually exclusive with respect to the users represented in each.

6. The method of claim 3 wherein organizing the initial data set into a training data set and a test data set includes randomly separating the selected users for representation in one or the other of the training data set or the test data set.

7. The method of claim 6 wherein the test data set and the training data set are mutually exclusive with respect to the users represented in each.

8. The method of claim 6 wherein organizing the initial data set into a training data set and a test data set further includes, for each of a first set of randomly selected users, including all messages for each of the users in the first set of users in a training data set, and for a second set of users, different than the first set of users, including all messages for each of the users in the second set in a test data set.

9. The method of claim 8 wherein the first set of users and the second set of users are mutually exclusive with respect to the users represented in each of the sets of users.

10. The method of claim 1 wherein generating a response predictive model based from the training data set includes adjusting model weights based on back propagation.

11. The method of claim 10 wherein generating a response predictive model from the training set includes determining whether a performance in the training has plateaued, and terminating the response predictive model generation in response to determining that the performance has plateaued.

12. The method of claim 11 wherein generating a response predictive model from the training set includes determining whether a defined maximum number of training epochs has been reached, and terminating the response predictive model generation in response to reaching the defined maximum number of training epochs.

13. The method of claim 11 wherein the response predictive model is predictive of whether a message sent by one user will receive a response.

14. The method of claim 1, further comprising:
collecting at least one of: the user profile information, the user behavioral information, or the messaging data for actual messaging between the plurality of users.

15. The method of claim 14 wherein collecting user profile information includes collecting at least one of: a user age, a user gender, a user country, a user ethnicity, or a user profession.

16. The method of claim 14 wherein collecting user behavioral information includes collecting at least one of: user specific messaging rates, user specific page views, or user specific login data.

17. The method of claim 1, further comprising:
converting at least one of: the user profile information, the user behavioral information, or the messaging data to at least one of a binary or a numerical representation.

18. The method of claim 1, further comprising:
identifying at least one response predictive model for use.

19. The method of claim 18 wherein identifying at least one response predictive model for use includes comparing the response predictive model to other response predictive models.

20. The method of claim 1, further comprising:
applying the identified response predictive model.

21. The method of claim 20, further comprising:
incorporating the identified response predictive model into a determining of potential candidates.

22. The method of claim 21 wherein incorporating the identified response predictive model into a determining of potential candidates includes adjusting weights in a matching algorithm.

23. The method of claim 21, further comprising:
on creation of a new user profile, informing other users who have a high predicted response rate of responding to an initial message from a new user logically associated with the new user profile.

24. A system to enhance messaging between users, the system comprising:
a communication network that includes servers, processors, display devices, input devices, and system memory devices to send messages between users and autonomously collect actual historical messaging data;
at least one processor; and
at least one non-transitory processor-readable medium communicatively coupled to the least one processor, wherein the at least one processor:
forms an initial data set, the initial data set comprising user profile information for a plurality of users, user behavioral information for at least some of the plurality of users, and message data indicative of messaging activity between at least some of the plurality of users;
organizes the initial data set into a training data set and a test data set, wherein in order to organize the initial data set into a training data set and a test data set, the at least one processor randomly separates the selected users for representation in one or the other of the training data set or the test data set;
generates a response predictive model using a machine learning system from the training data set which includes the user profile information, the user behavioral information and message data;
evaluates the response predictive model generated from the training data set against the corresponding test data set, wherein at least some of the test data set is based on actual historical messaging data; and
determines an accuracy of the response prediction model using the actual historical messaging data.

25. The system of claim 24 wherein in order to form an initial data set, the at least one processor selects users who have received at least a first defined minimum number of messages, and who responded to at least a second defined minimum number of the received messages, and including in the initial data set the user profile information, the user behavioral information and the messaging data for the selected users.

26. The system of claim 25 wherein the at least one processor further select only users who have a logically associated attribute value indicative of a female gender.

27. The system of claim 24 wherein the test data set and the training data set are mutually exclusive with respect to the users represented in each.

28. The system of claim 24 wherein the at least one processor adjusts model weights based on back propagation in order to generate the response predictive model.

29. The system of claim 24 wherein the at least one processor further collects at least one of: the user profile information, the user behavioral information, or the messaging data for actual messaging between the plurality of users.

30. The system of claim 29 wherein to collect user profile information, the at least one processor collects an attribute value indicative of at least one of: a user's age, a user's gender, a user's country, a user's ethnicity, or a user's profession.

31. The system of claim 29 wherein to collect user behavioral information, the at least one processor collects data indicative of at least one of: user specific messaging rates, user specific page views, user specific login data.

32. The system of claim 24 wherein the at least one processor further converts at least one of: the user profile information, the user behavioral information, or the messaging data to at least one of a binary or a numerical representation.

33. The system of claim 24 wherein the at least one processor further:
  compares the response predictive model to other response predictive models; and
  identifies at least one response predictive model for use based on the comparison.

34. The system of claim 24 wherein the at least one processor further:
  uses the identified response predictive model; and
  incorporates the identified response predictive model into a determination of potential candidates.

35. The system of claim 24 wherein the at least one processor further:
  informs a new user of other users who have a high predicted response rate of responding to an initial message from the new user based at least in part on the responsive predictive model.

36. The system of claim 24 wherein the at least one processor further determines whether a global minimum has been found, and terminates generation of the response predictive model generation in response to determining that the global minimum has been found.

37. A system to enhance messaging between users, the system comprising:
  a communication network that includes servers, processors, display devices, input devices, and system memory devices to send messages between users and autonomously collect actual historical messaging data;
  at least one processor; and
  at least one non-transitory processor-readable medium communicatively coupled to the least one processor, wherein the at least one processor:
    forms an initial data set, the initial data set comprising user profile information for a plurality of users, user behavioral information for at least some of the plurality of users, and message data indicative of messaging activity between at least some of the plurality of users;
    organizes the initial data set into a training data set and a test data set, wherein in order to organize the initial data set into a training data set and a test data set, the at least one processor randomly selects for inclusion in either the training data set or the test data set the user profile information, the user behavioral information, and the messaging data from all of the selected users on a message by message basis;
    generates a response predictive model using a machine learning system from the training data set which includes the user profile information, the user behavioral information and message data;
    evaluates the response predictive model generated from the training data set against the corresponding test data set, wherein at least some of the test data set is based on actual historical messaging data; and
    determines the accuracy of the response prediction model using the actual historical messaging data.

38. The system of claim 37 wherein the test data set and the training data set are not mutually exclusive with respect to the users represented in each.

39. A system to enhance messaging between users, the system comprising:
  a communication network that includes servers, processors, display devices, input devices, and system memory devices to send messages between users and autonomously collect actual historical messaging data;
  at least one processor; and
  at least one non-transitory processor-readable medium communicatively coupled to the least one processor, wherein the at least one processor:
    forms an initial data set, the initial data set comprising user profile information for a plurality of users, user behavioral information for at least some of the plurality of users, and message data indicative of messaging activity between at least some of the plurality of users;
    organizes the initial data set into a training data set and a test data set, wherein to organize the initial data set into a training data set and a test data set, the at least one processor further, for each of a first set of randomly selected users, includes all messages for each of the users in the first set of users in a training data set, and for a second set of users, different than the first set of users, includes all messages for each of the users in the second set in a test data set;
    generates a response predictive model using a machine learning system from the training data set which includes the user profile information, the user behavioral information and message data;
    evaluates the response predictive model generated from the training data set against the corresponding test data set, wherein at least some of the test data set is based on actual historical messaging data; and
    determines the accuracy of the response prediction model using the actual historical messaging data.

40. The system of claim 39 wherein the first set of users and the second set of users are mutually exclusive with respect to the users represented in each of the sets of users.

* * * * *

UNITED STATES PATENT AND TRADEMARK OFFICE
CERTIFICATE OF CORRECTION

PATENT NO. : 10,540,607 B1  
APPLICATION NO. : 14/563504  
DATED : January 21, 2020  
INVENTOR(S) : Steve Oldridge Page 1 of 1

It is certified that error appears in the above-identified patent and that said Letters Patent is hereby corrected as shown below:

On the Title Page

Item (56) References Cited, Other Publications, page 5 Column 2, Lines 22-25:
"Office Action, dated Mar. 20, 2018, for U.S. Appl. No. 14/737,121, "Oldridge et al., Apparatus, Method and Article to Facilitate User Behavioral Based Determination of User Values in a Network Environment," 39 pages."
Should read:
--Office Action, dated Mar. 20, 2018, for U.S. Appl. No. 14/737,121, Oldridge et al., "Apparatus, Method and Article to Facilitate User Behavioral Based Determination of User Values in a Network Environment," 39 pages.--

Signed and Sealed this  
Thirty-first Day of March, 2020

Andrei Iancu  
*Director of the United States Patent and Trademark Office*